(12) United States Patent
Walker et al.

(10) Patent No.: US 7,966,666 B2
(45) Date of Patent: Jun. 21, 2011

(54) CHIP ATTACK PROTECTION

(75) Inventors: John Walker, Little Milton (GB); Itsik Mantin, Shoham (IL)

(73) Assignee: NDS Limited, Staines, Middlesex (GB)

( * ) Notice: Subject to any disclaimer, the term of this patent is extended or adjusted under 35 U.S.C. 154(b) by 399 days.

(21) Appl. No.: 12/087,942

(22) PCT Filed: Dec. 11, 2006

(86) PCT No.: PCT/IL2006/001421
§ 371 (c)(1),
(2), (4) Date: Sep. 10, 2008

(87) PCT Pub. No.: WO2007/086046
PCT Pub. Date: Aug. 2, 2007

(65) Prior Publication Data
US 2009/0001821 A1    Jan. 1, 2009

(30) Foreign Application Priority Data

Jan. 24, 2006 (IL) .......................................... 173341
May 24, 2006 (IL) .......................................... 175902

(51) Int. Cl.
*G08B 21/00* (2006.01)
(52) U.S. Cl. ........................................................ 726/34
(58) Field of Classification Search ........................ None
See application file for complete search history.

(56) References Cited

U.S. PATENT DOCUMENTS

| | | | |
|---|---|---|---|
| 5,353,350 A | 10/1994 | Unsworth et al. | |
| 6,233,339 B1 | 5/2001 | Kawano et al. | |
| 6,421,013 B1 | 7/2002 | Chung | |
| 2001/0033012 A1 | 10/2001 | Kommerling et al. | |
| 2002/0008428 A1* | 1/2002 | Smola et al. ................... | 307/413 |
| 2003/0132302 A1* | 7/2003 | Hattori .......................... | 235/492 |
| 2004/0066296 A1 | 4/2004 | Atherton | |

FOREIGN PATENT DOCUMENTS

WO  WO 01/50530 A1  7/2001
WO  WO 2005/022443 A2  3/2005

OTHER PUBLICATIONS

Mar. 11, 2009 Office Communication in connection with IL 175902 (w/English translation) (5 pgs.).

(Continued)

*Primary Examiner* — Brandon S Hoffman
(74) *Attorney, Agent, or Firm* — Husch Blackwell LLP

(57) ABSTRACT

A system for protecting a chip with an integrated circuit disposed on a first surface, the system including, disposed on the first surface, a first antenna, signal analyzer, chip controller and a signal generator which is operative to supply an outbound signal for transmission by the first antenna, a circuit arrangement, disposed on a second surface of the chip, including a shielding arrangement and a second antenna to receive the outbound signal, the circuit arrangement being operative to transmit a return signal from the second antenna to the first antenna, such that a breach in the shielding arrangement results in a change in, or cessation of, the return signal for detection by the signal analyzer, and a chip controller disposed on the first surface being operative to perform an action on the integrated circuit in response to the detection of the breach. Related apparatus and methods also included.

21 Claims, 13 Drawing Sheets

OTHER PUBLICATIONS

Anders Hanneborg et al., "Silicon-to-silicon anodic bonding with a borosilicate glass layer", Journal of Micromechanics and Microengineering (vol. 1, pp. 139-144) (Institute of Physics Publishing, 1991).

Hideki Takagi et al., "Aligned room-temperature bonding of silicon wafers in vacuum by argon beam surface activation" Journal of Micromechanics and Microengineering (vol. 15, pp. 290-295) (Institute of Physics Publishing, 2005).

Oct. 13, 2010 Office Communication in connection with prosecution of EP 06 82 1637.3.

* cited by examiner

FIG. 7

FRONT CIRCUIT

- 98 — SIGNAL GENERATOR
- 100 — SIGNAL ANALYZER
- 102 — CHIP CONTROLLER
- IC
- 96
- 104
- 118
- 92
- 90

BACK CIRCUIT

- 108 — RECTIFIER
- 110 — CHECKER
- 112 — SHIELD
- 114 — REPORTER
- 106
- 94

FIG. 8

FRONT CIRCUIT

LAYER 1

- 120
- 92
- CHIP CONTROLLER
- SIGNAL ANALYZER
- SIGNAL GENERATOR

LAYER 2

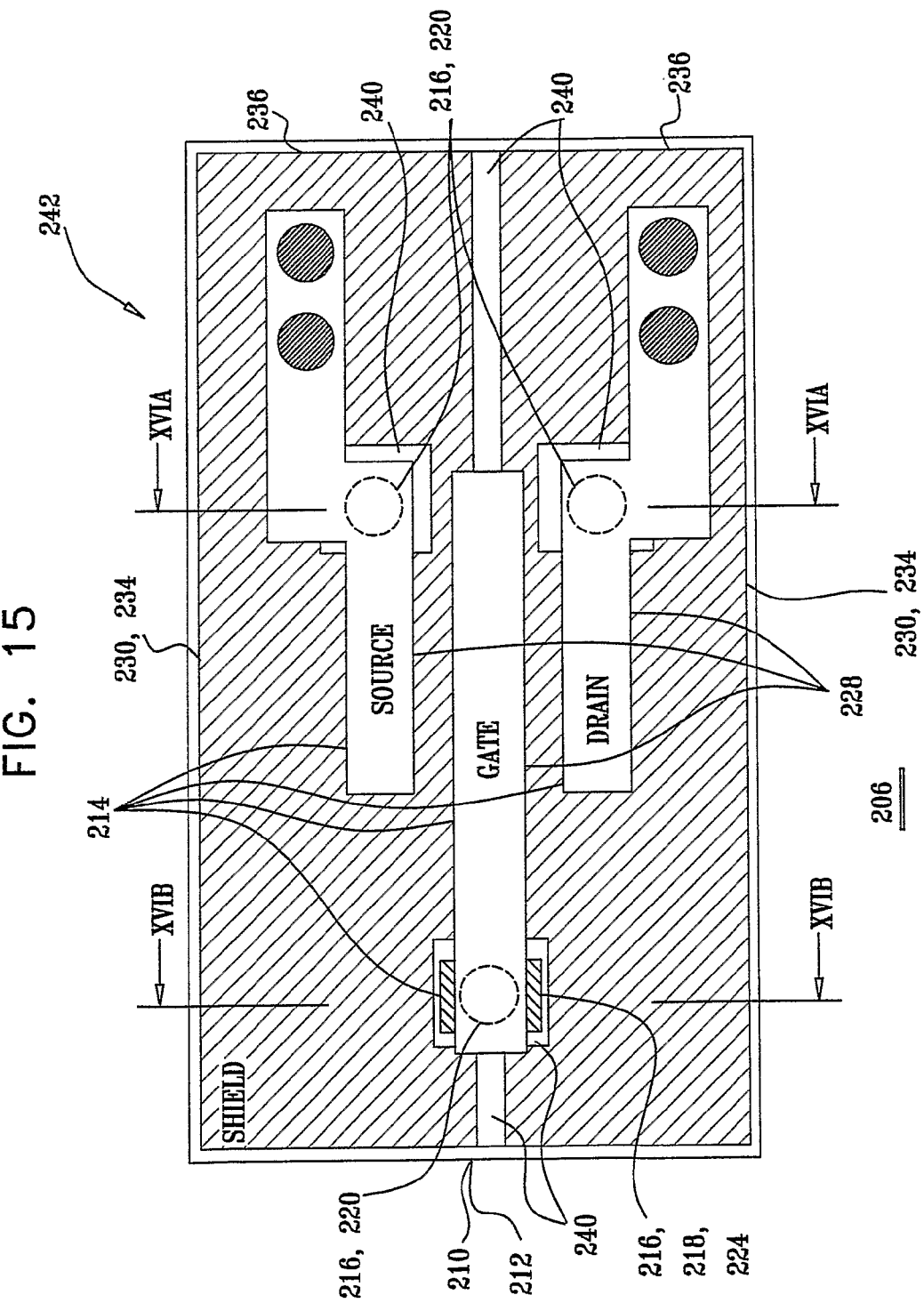

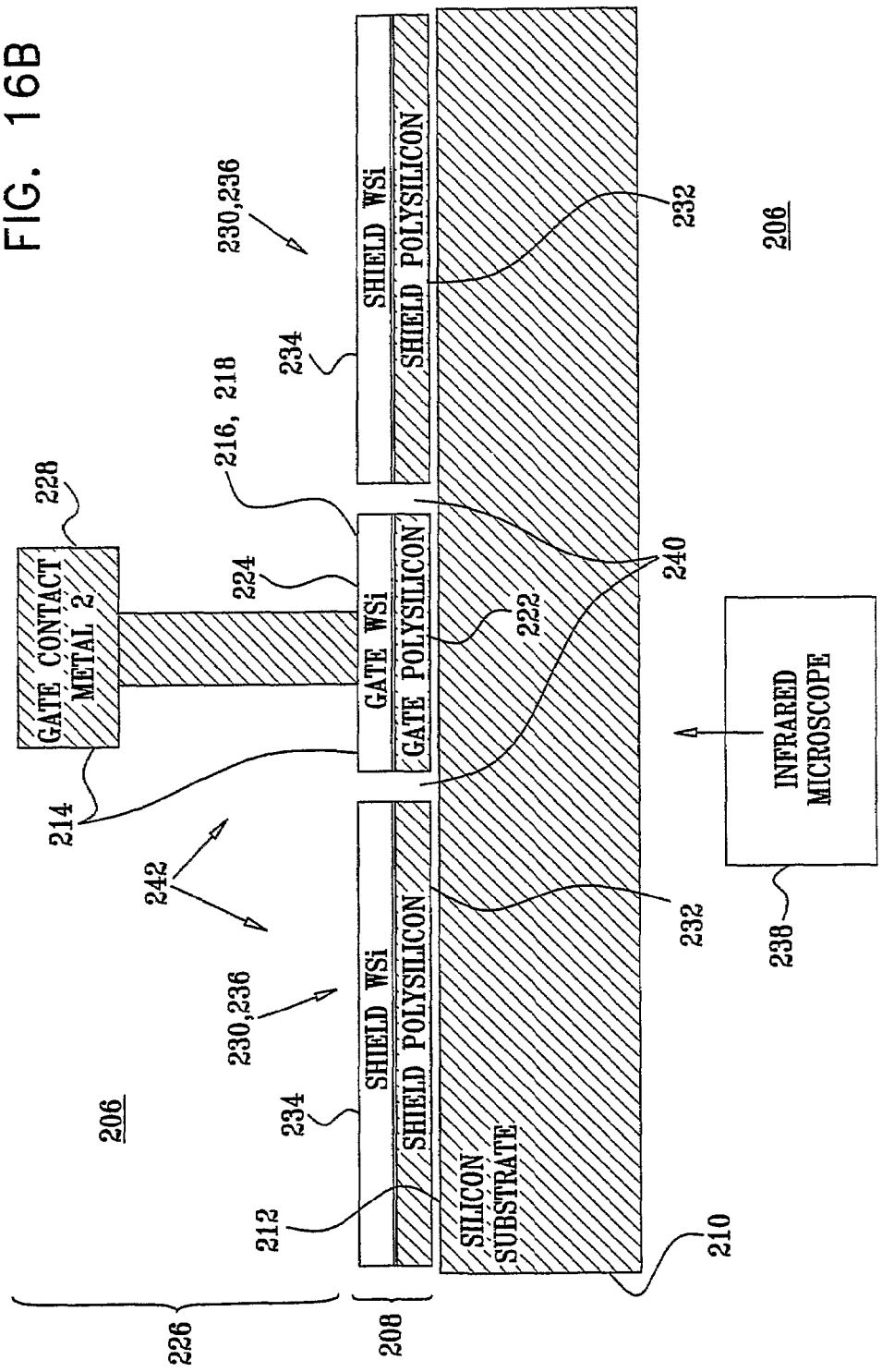

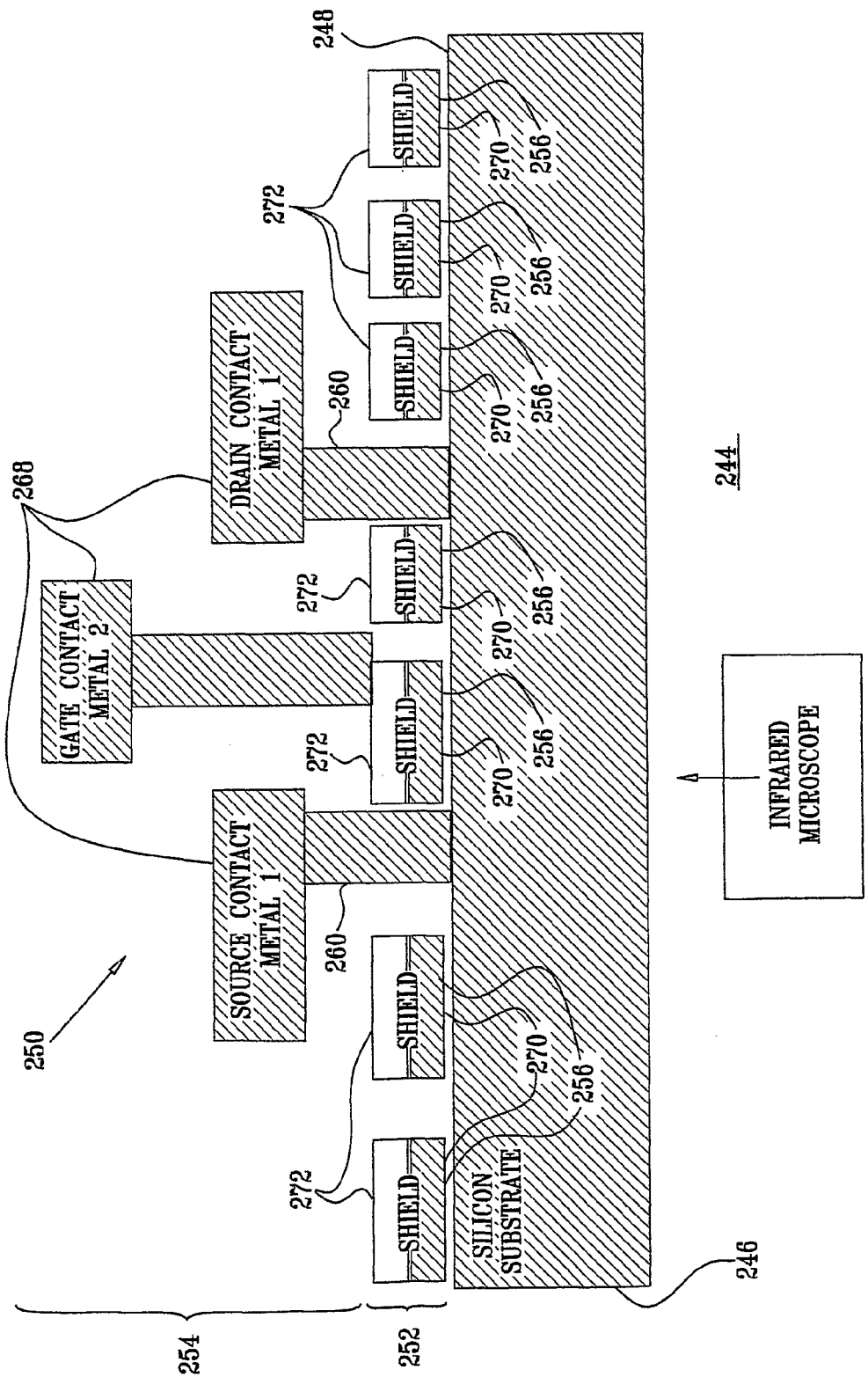

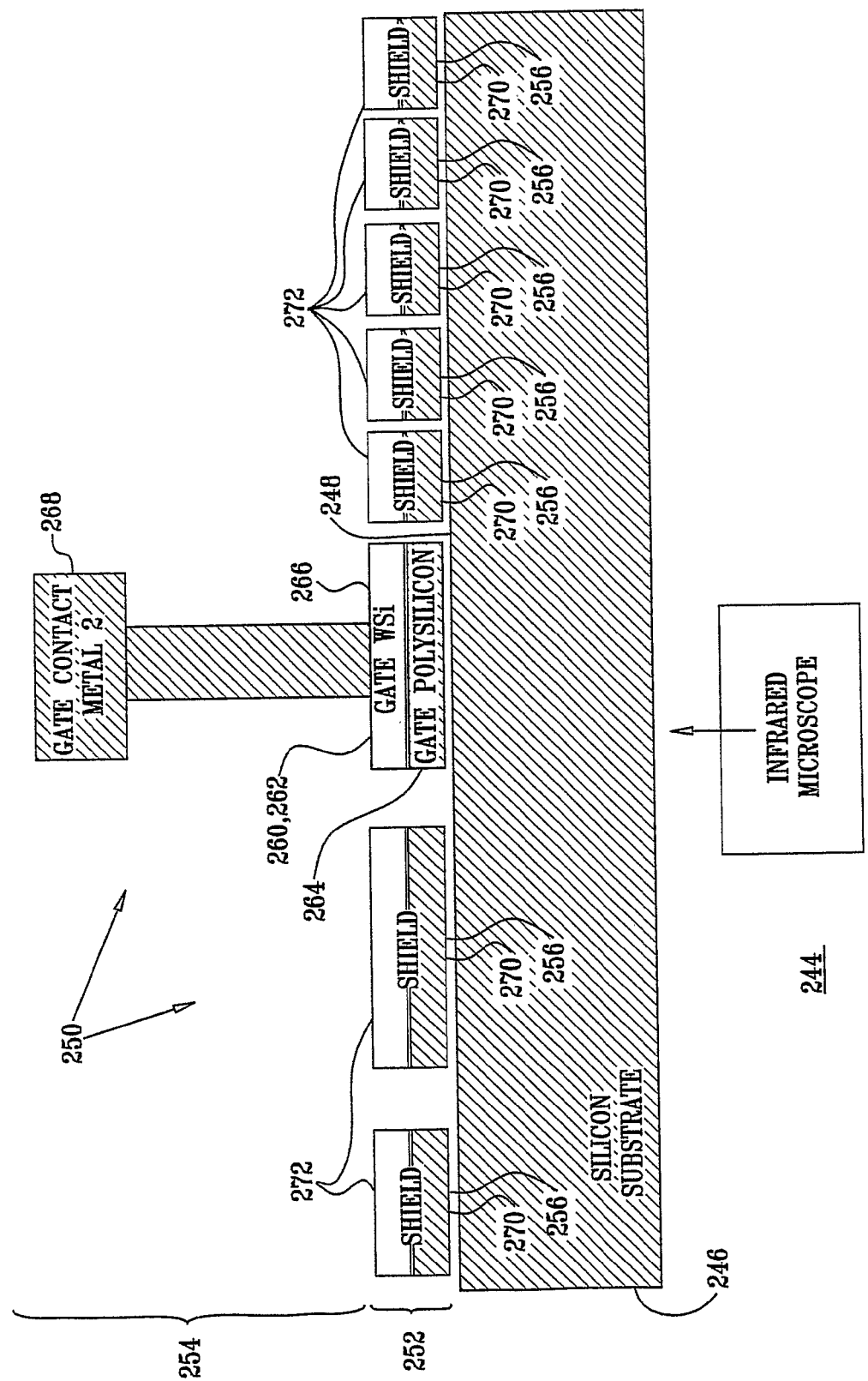

CHIP ATTACK PROTECTION

The present application is a 35 USC §371 application of PCT/IL2006/001421, filed on 11 Dec. 2006 and entitled "Chip Attack Protection", which was published on 2 Aug. 2007 in the English language with International Publication Number WO 2007/086046, and which relies for priority on Israel Patent Application No. 173341, filed on 24 Jan. 2006, and Israel Patent Application No. 175902, filed 24 May 2006.

FIELD OF THE INVENTION

The present invention relates to protecting a chip from attack, and in particular, relates to protecting a chip from attack through the chip substrate.

BACKGROUND OF THE INVENTION

By way of introduction, security chips are vulnerable to attacks on the physical structure of the chips. In particular, attackers seek to modify circuits in order to gain information stored in the chip and/or to change the operating characteristics of the chips to characteristics useful to the attacker. Attacks typically come in the form of probing and, more recently, focused ion beam (FIB) modification. Interconnection tracks and other circuit elements can be interrogated, or have signals injected. Circuits may be rerouted, disabled or crippled. There are many possible attacks relying on physical modification.

The most common defense to the attacks is to use a shield.

Passive shields are typically effective in preventing viewing of the circuit and making attacks more time-consuming. Passive shields may be removed, however, without affecting the operation of the device. The passive shields are often made from the upper layer of metal interconnects in a multilayer circuit. However, a breach in the shield is not detected in passive shields.

Active shields may look similar to passive shields. However, a breach in an active shield is typically detected and normally results in disabling the chip. Circumventing an active shield is possible, but circumvention is significantly more difficult and time-consuming and is generally limited to a small number of small select areas of the chip under attack. Detailed knowledge and experience is generally required to make an active shield attack successful.

Reference is now made to FIG. 1, which is a cross-sectional view of a chip 10 undergoing a focused ion beam (FIB) backside attack. A new form of FIB attack is emerging whereby the attack is not through a front surface 12 of the chip 10 but through the silicon substrate via a back surface 14 of the chip 10. The new form of attack is generally referred to as FIB backside attack. The FIB backside attack was developed from the need for FIB to make circuit modifications to flipchip devices or on lower metal layers of a multi-layer stacked chip. With chip designs having seven or more layers, for example, it may be easier to reach a lower metal layer, for example, via the back surface 14 than delving through many layers of interconnects from the front surface 12. A typical attack is now described below.

The chip 10 is reverse-engineered to discover the layout of the chip 10 and to identify points of the chip 10 to attack. Based on the experience of the attacker, the attacker typically selects a useful circuit node that may give the secret information needed to break the chip 10.

The chip 10 is then generally removed from a package (not shown) and preferably mounted such that the chip 10 operates normally. The preferred means of providing power and operating signals is in the form of a plurality of wire bonds 16.

The chip 10 is typically thinned from the back surface 14 to about 50 or 100 microns using a physical grinding technique.

A deep trench 18 is generally milled from the back surface 14 in the area where the attack is to take place. The chip 10 is thinned locally to a few microns (3-10 microns), stopping the thinning just as the active devices (implanted doping wells) are reached. The lateral area of the thinning is typically in the range of 50-200 microns square.

A thin layer of insulator is generally deposited in the deep trench 18 and various navigation techniques are applied to find the exact site of the attack.

A plurality of individual tracks 20 of the chip 10 are typically milled to. A plurality of metal contacts 22 are generally deposited on the individual tracks 20 for use during the attack. The tracks 20 may then be measured for secret data content or severed to disable parts of the circuit.

An active shield (not shown) is typically used to protect the front surface 12 of the chip 10 from attack. However, putting an active shield on the back surface 14 of the chip 10 to prevent attacks through the back surface 14 via the substrate is particularly difficult. The main difficulty is due to establishing communication between a processor (not shown) on the front surface 12 and the shield on the back surface 14. Communication is needed such that an attack on the back surface 14 leads to shut down of the chip 10 which is generally performed by the processor on the front surface 12. Connecting the shield on the back surface 14 with vias (not shown) to the processor on the front surface 12 must generally be made through the chip 10. The vias are therefore obvious and prone to attack, for example, but not limited to, by shorting out the vias or by imitating signals of the active shield. In addition, the vias generally need to be very deep in the chip 10 thereby making manufacture of the backside shield very difficult. Additionally, the manufacturing of the vias is generally incompatible with current processing technology.

The following references are believed to represent the state of the art:

US Published Patent Application 2001/0033012 of Kömmerling, et al.;

PCT Published Patent Application WO 01/50530 of Kömmerling, et al.;

Article entitled "Aligned room-temperature bonding of silicon wafers in vacuum by argon beam surface activation" by Hideki Takagi and Ryutaro Maeda in the Journal of Micromechanics and Microengineering on pages 290-295, volume 15, published by the Institute of Physics Publishing, UK; and Article entitled "Silicon-to-silicon anodic bonding with a borosilicate glass layer" by Anders Hanneborg, Martin Nese and Per Øhlckers in the Journal of Micromechanics and Microengineering on pages 139-144, volume 1, published by the Institute of Physics Publishing, UK.

The disclosures of all references mentioned above and throughout the present specification, as well as the disclosures of all references mentioned in those references, are hereby incorporated herein by reference.

SUMMARY OF THE INVENTION

The present invention seeks to provide a system and method for protecting a security microprocessor on both sides from attack.

Three preferred embodiments are described briefly in the summary below. One preferred embodiment of the present invention uses an active circuit disposed on the back of a chip in wireless contact with the front of the chip. Another preferred embodiment of the present invention uses a passive circuit disposed on the back of a chip in wireless contact with the front of the chip. Yet another preferred embodiment of the present invention includes two chips which are connected back-to-back to provide protection for each other. These three embodiments are described in more detail in the summary below and in the detailed description of the invention.

In accordance with a preferred embodiment of the present invention, the protection system preferably includes two circuits, a front circuit disposed on the front surface of the chip and a back circuit disposed on the back surface of the chip. Each circuit typically includes an antenna therein. The back circuit preferably includes a shielding arrangement to shield the back surface of the chip. The front circuit preferably transmits an alternating current signal to the back circuit via the antennas, thereby providing power to the back circuit. The signal received by the back circuit is typically rectified. The rectified signal is generally used to power a checker which checks the integrity of the shielding arrangement. If the shielding arrangement is intact, a return signal is typically sent back to the front circuit via the antennas. A breach in the shielding arrangement generally results in either a change or cessation of the return signal. A signal analyzer in the front circuit preferably detects the breach in the shielding arrangement based on the change or cessation of the return signal. A chip controller in the front circuit typically performs an action on the integrated circuit, such as chip reset, in response to the detection of the breach.

In accordance with a most preferred embodiment of the present invention, the back circuit is implemented using only passive components. The use of passive components generally makes communication as it is normally understood, impossible. However, communication can still be achieved, for example by implementing the back circuit as a resonant circuit which responds to a signal transmitted by the front circuit. The antenna of the back circuit is typically an inductor. Other passive components of the circuit typically include a capacitor and a resistor which are added using simple circuit printing techniques. The resistor is typically formed as a long thin conducting track covering a large area in some serpentine path. The other components including the antenna and capacitor also typically form part of the shield. If the shield is intact the back circuit generally responds to the signal of the front circuit with a signal preferably having a resonant frequency and a Q-factor. If the shield is breached the resonant frequency and/or the Q-factor will preferably change. If the shield is totally breached the back circuit will generally fail to respond at all. The signal analyzer in the front circuit preferably detects the breach in the shielding arrangement based on the change of the resonant frequency and/or the Q-factor or the cessation of the return signal. The chip controller in the front circuit generally performs an action on the integrated circuit, such as chip reset, in response to the detection of the breach.

In accordance with an alternative preferred embodiment of the present invention, two chips are connected back-to-back to provide protection for each other. An active shield is preferably disposed on the front surface of each of two chips. The two chips are then typically mechanically connected preferably by direct bonding the back surface of each chip together. Therefore, the active shield of one chip generally protects the backside of the other chip, and vice-versa. The two chips are typically connected by a physical data-connection wherein data between the two chips is encrypted. Alternatively, the two chips may be connected by a wireless connection using an antenna arrangement.

In accordance with other preferred embodiments of the present invention, the integrity of the shields is checked based on functions performed by the shields if the shields are intact.

In accordance with an alternative preferred embodiment of the present invention, backside attack is addressed by disposing a metal silicide between gaps in a polysilicon layer of an integrated circuit to prevent Infrared navigation based attacks.

In accordance with another alternative preferred embodiment of the present invention, an active shield is included in a polysilicon layer of an integrated circuit.

There is thus provided in accordance with a preferred embodiment of the present invention There is also provided in accordance with still another preferred embodiment of the present invention a chip security system for protecting a chip from backside attack, the chip having a first surface and a second surface opposite the first surface, the first surface including an integrated circuit disposed thereon, the system including a first antenna disposed on the first surface, a signal generator disposed on the first surface, the signal generator being operationally connected to the first antenna, the signal generator being operative to supply an outbound signal for transmission by the first antenna, a circuit arrangement disposed on the second surface, the circuit arrangement including a second antenna to wirelessly receive the outbound signal transmitted by the first antenna thereby providing power to the circuit arrangement, and a shielding arrangement to at least partially shield the second surface, wherein the circuit arrangement is operative to transmit a return signal wirelessly from the second antenna to the first antenna, such that a breach in the shielding arrangement results in a change in, or cessation of, the return signal, a signal analyzer disposed on the first surface, the signal analyzer being operationally connected to the first antenna, the signal analyzer being operative to detect the breach in the shielding arrangement from the change in, or the cessation, of the return signal, and a chip controller disposed on the first surface, the chip control being operationally connected to the signal analyzer, the chip controller being operative to perform an action on the integrated circuit in response to the detection of the breach by the signal analyzer.

Further in accordance with a preferred embodiment of the present invention the antenna is included in the shielding arrangement.

Still further in accordance with a preferred embodiment of the present invention the action of the chip controller includes resetting at least part of the integrated circuit.

Additionally in accordance with a preferred embodiment of the present invention the outbound signal includes a radio-frequency signal.

Moreover in accordance with a preferred embodiment of the present invention the circuit arrangement includes active circuit components, the circuit arrangement including a rectifier to rectify the outbound signal received by the second antenna, a checker operationally connected to the rectifier, the checker being operative to check the integrity of the shielding arrangement, and a reporter operationally connected to the checker and the second antenna, the reporter being operative to report back using the return signal to the signal analyzer via the second antenna and first antenna on the integrity of the shielding arrangement.

Further in accordance with a preferred embodiment of the present invention the return signal is a pulsed signal.

Still further in accordance with a preferred embodiment of the present invention the return signal is a continuous signal.

Additionally in accordance with a preferred embodiment of the present invention the reporter is operative to form the return signal by amplitude modulating the outbound signal.

Moreover in accordance with a preferred embodiment of the present invention the circuit arrangement includes passive circuit components and excludes active circuit components.

Further in accordance with a preferred embodiment of the present invention the circuit arrangement includes a resonant circuit which has an associated resonant frequency.

Still further in accordance with a preferred embodiment of the present invention the return signal has a Q-factor.

Additionally in accordance with a preferred embodiment of the present invention the outbound signal includes a swept frequency signal such that the return signal is a maximum when the swept frequency signal is at the resonant frequency.

Moreover in accordance with a preferred embodiment of the present invention the outbound signal includes a range of frequencies at the same time.

Further in accordance with a preferred embodiment of the present invention the signal generator forms the range of frequencies by generating white noise.

Still further in accordance with a preferred embodiment of the present invention the signal analyzer is operative to analyze a change in at least one of the resonant frequency and the Q-factor of the return signal in order to detect the breach in the shielding arrangement.

Additionally in accordance with a preferred embodiment of the present invention the resonant circuit includes an inductor, a capacitor and a resistor, the second antenna being included in the inductor.

Moreover in accordance with a preferred embodiment of the present invention the capacitor is included in shielding arrangement.

Further in accordance with a preferred embodiment of the present invention the circuit arrangement is formed on a film which is mechanically connected to the second surface.

Still further in accordance with a preferred embodiment of the present invention the film is a plastic film.

There is also provided in accordance with still another preferred embodiment of the present invention a chip security system, including two chips, each of the chips including a first surface and a second surface opposite the first surface, an integrated circuit disposed on the first surface, a shield disposed on the first surface, and a shield manager disposed on the first surface, the shield manager being operative to check integrity of the shield and to perform an action on the integrated circuit in response to detecting a breach in the shield, wherein the chips are mechanically connected together via the second surface of each of the chips.

Additionally in accordance with a preferred embodiment of the present invention the chips are mechanically connected together by direct bonding.

Moreover in accordance with a preferred embodiment of the present invention the chips are bonded together by argon beam surface activation bonding.

Further in accordance with a preferred embodiment of the present invention the integrated circuit of one of the chips is operationally connected to the integrated circuit of the other one of the chips.

Still further in accordance with a preferred embodiment of the present invention, the system includes a substrate, wherein the integrated circuit of the one chip is electrically connected to the integrated circuit of the other chip via the substrate.

Additionally in accordance with a preferred embodiment of the present invention the one chip is mounted flip-chip on the substrate.

Moreover in accordance with a preferred embodiment of the present invention the other chip is electrically connected to the substrate via ball-bond connections.

Further in accordance with a preferred embodiment of the present invention the integrated circuit of each of the chips is operative such that communication between the integrated circuit of the one chip and the integrated circuit of the other chip is encrypted.

Still further in accordance with a preferred embodiment of the present invention the communication is encrypted using a session key.

Additionally in accordance with a preferred embodiment of the present invention the integrated circuit of each of the chips includes a secret shared by the chips for use in the encrypted communication.

Moreover in accordance with a preferred embodiment of the present invention the thickness of the chips together is between 200 microns and 400 microns.

Further in accordance with a preferred embodiment of the present invention each of the chips includes silicon.

There is also provided in accordance with still another preferred embodiment of the present invention a chip security system, including a chip arrangement having a first surface and a second surface, a plurality of shields including a first shield and a second shield, the first shield being disposed on the first surface, the second shield being disposed on the second surface, an integrated circuit disposed on one of the first surface and the second surface, and a shield manager disposed on a same surface of the chip arrangement as the integrated circuit, the shield manager being operationally connected to the shields and the integrated circuit, the shield manager including a number generator to generate a number, the shield manager being operative to send the number to the first shield, the first shield being operative to perform a first function on the number thereby yielding a first value if the first shield is intact, the second shield being operative to receive the first value and perform a second function on the first value yielding a second value if the second shield is intact, the shield manager including a check module to receive the second value, and check a validity of the second value based on the number generated by the number generator in order to determine an integrity of the shields.

Still further in accordance with a preferred embodiment of the present invention the check module is operative to perform a calculation using the first function and the second function with the number as input for the calculation, and compare a result of the calculation to the second value in order to determine the integrity of the shields.

Additionally in accordance with a preferred embodiment of the present invention the chip arrangement includes a sole chip.

Moreover in accordance with a preferred embodiment of the present invention the chip arrangement includes a plurality of chips mechanically connected to each other.

Further in accordance with a preferred embodiment of the present invention the chips are mechanically connected together by direct bonding.

Still further in accordance with a preferred embodiment of the present invention the first surface and the second surface are substantially parallel to each other disposed on opposite sides of the chip arrangement.

There is also provided in accordance with still another preferred embodiment of the present invention a chip security system, including a chip arrangement having a first surface and a second surface, a plurality of shields including a first shield and a second shield, the first shield being disposed on the first surface, the second shield being disposed on the second surface, an integrated circuit disposed on the first surface, and a shield manager disposed on the first surface, the shield manager being operationally connected to the shields and the integrated circuit, the shield manager including a number generator to generate a number, the shield manager being operative to send test data based on the number to the second shield, the second shield being operative to perform a function yielding a value if the second shield is intact, the shield manager including a check module to receive the value, and perform an operation on the value in order to determine an integrity of the second shield.

Additionally in accordance with a preferred embodiment of the present invention the test data is equal to the number and wherein the check module is operative to perform a calculation using the function with the number as input for the calculation, and compare a result of the calculation to the value in order to determine the integrity of the second shield.

Moreover in accordance with a preferred embodiment of the present invention the chip arrangement includes a sole chip.

Further in accordance with a preferred embodiment of the present invention the chip arrangement includes a plurality of chips mechanically connected to each other.

Still further in accordance with a preferred embodiment of the present invention the chips are mechanically connected together by direct bonding.

Additionally in accordance with a preferred embodiment of the present invention the first surface and the second surface are substantially parallel to each other disposed on opposite sides of the chip arrangement.

Moreover in accordance with a preferred embodiment of the present invention the chip arrangement includes a first chip and a second chip, the first chip including the first surface and a third surface, the first surface being opposite the third surface, the second chip including the second surface and a fourth surface, the second surface being opposite the fourth surface, wherein the chips are mechanically connected together via the third surface and the fourth surface.

There is also provided in accordance with still another preferred embodiment of the present invention a integrated circuit protection system, including a silicon substrate having a surface, an integrated circuit disposed on the surface of the silicon substrate, the integrated circuit including a first layer including a plurality of structures, the structures including at least one bilayer structure, the at least one bilayer structure including a polycrystalline silicon sub-layer and a metal silicide sub-layer, and a second layer including a plurality of metal elements, the first layer being closer to the surface that the second layer, and a shield arrangement including a polycrystalline silicon sub-layer and a metal silicide sub-layer, the shield arrangement being disposed in the first layer such that the shield arrangement does not perform an electronic function in the integrated circuit.

Further in accordance with a preferred embodiment of the present invention the shield arrangement is disposed in the first layer such that a view seen by an infrared microscope of at least one of the metal elements is at least partially obscured when the infrared microscope images the integrated circuit through the silicon substrate.

Still further in accordance with a preferred embodiment of the present invention the shield arrangement is disposed in the first layer such that a view seen by an infrared microscope of at least one of the metal elements is blocked when the infrared microscope images the integrated circuit through the silicon substrate.

Additionally in accordance with a preferred embodiment of the present invention the one metal element forms a bus operative to carry data which will be encrypted.

Moreover in accordance with a preferred embodiment of the present invention the one metal element forms a signal track of a defense mechanism of the integrated circuit.

Further in accordance with a preferred embodiment of the present invention the shield arrangement is disposed in the first layer such that a view seen by an infrared microscope beyond the first layer is at least partially obscured when the infrared microscope images the integrated circuit through the silicon substrate.

Still further in accordance with a preferred embodiment of the present invention the shield arrangement is disposed in the first layer such that a view seen by an infrared microscope beyond the first layer is blocked when the infrared microscope images the integrated circuit through the silicon substrate.

Additionally in accordance with a preferred embodiment of the present invention the first layer defines a plane, the shield arrangement being disposed in the first layer such that the shield arrangement and at least one of the structures form a region, the region including at least one gap, the gap having a minimum dimension measured parallel to the plane of less than about 550 nanometers.

Moreover in accordance with a preferred embodiment of the present invention the gap has a minimum dimension measured parallel to the plane of less than 550 nanometers.

Further in accordance with a preferred embodiment of the present invention the shield arrangement includes a plurality of shield elements, each of the shield elements including a polycrystalline silicon sub-layer and a metal silicide sub-layer.

Still further in accordance with a preferred embodiment of the present invention the metal silicide is tungsten silicide.

There is also provided in accordance with still another preferred embodiment of the present invention a integrated circuit protection system, including a silicon substrate having a surface, and an integrated circuit disposed on the surface of the silicon substrate, the integrated circuit including a first layer including a plurality of structures including a at least one bilayer structure having a polycrystalline silicon sub-layer and a metal silicide sub-layer, and a second layer including a plurality of metal elements, the first layer being closer to the surface that the second layer, a shield arrangement including a polycrystalline silicon sub-layer and a metal silicide sub-layer, the shield arrangement being disposed in the first layer, and a breach-detection circuit operatively connected to the shield arrangement such that a breach in the shield arrangement is detected by the breach-detection circuit, the breach-detection circuit being operative to perform an action on another part of the integrated circuit in response to the detection of the breach.

There is also provided in accordance with still another preferred embodiment of the present invention a method for manufacturing a chip security system, the method including providing two chips, each chip having a first surface and a second surface opposite the first surface, disposing on the first surface an integrated circuit, a shield disposed and a shield manager, the shield manager being operative to check integrity of the shield and to perform an action on the integrated circuit in response to detecting a breach in the shield, and mechanically connecting the chips together via the second surface of each of the chips.

There is also provided in accordance with still another preferred embodiment of the present invention a method for protecting an integrated circuit, including providing a silicon substrate having a surface, disposing an integrated circuit disposed on the surface of the silicon substrate, the integrated circuit including a first layer including a plurality of structures, including a at least one bilayer structure having a polycrystalline silicon sub-layer and a metal silicide sub-layer, and a second layer including a plurality of metal elements, the first layer being closer to the surface that the second layer, and disposing a shield arrangement in the first layer such that the shield arrangement does not perform an electronic function in the integrated circuit, the shield arrangement including a polycrystalline silicon sub-layer and a metal silicide sub-layer.

There is also provided in accordance with still another preferred embodiment of the present invention a method for protecting an integrated circuit, including providing a silicon substrate having a surface, and disposing an integrated circuit on the surface of the silicon substrate, the integrated circuit including a first layer including a plurality of structures, including a at least one bilayer structure having a polycrystalline silicon sub-layer and a metal silicide sub-layer, and a second layer including a plurality of metal elements, the first layer being closer to the surface that the second layer, a shield arrangement including a polycrystalline silicon sub-layer and a metal silicide sub-layer, the shield arrangement being disposed in the first layer, and a breach-detection circuit operatively connected to the shield arrangement such that a breach in the shield arrangement is detected by the breach-detection circuit, the breach-detection circuit being operative to perform an action on another part of the integrated circuit in response to the detection of the breach.

BRIEF DESCRIPTION OF THE DRAWINGS

The present invention will be understood and appreciated more fully from the following detailed description, taken in conjunction with the drawings in which:

FIG. 7 is a simplified circuit diagram of an alternative preferred backside shield for use with the system of FIG. 2;

FIG. 8 is a simplified circuit layout view of a front circuit of the backside shield of FIG. 7;

FIG. 15 is a plan view of an integrated circuit protection system constructed and operative in accordance with another alternative preferred embodiment of the present invention;

FIG. 16b is a cross-sectional view through the line XVIB of FIG. 15;

FIG. 18a is a cross-sectional view through the line XVIIIA of FIG. 17; and

FIG. 18b is a cross-sectional view through the line XVIIIB of FIG. 17.

DETAILED DESCRIPTION OF A PREFERRED EMBODIMENT

Figure 1:
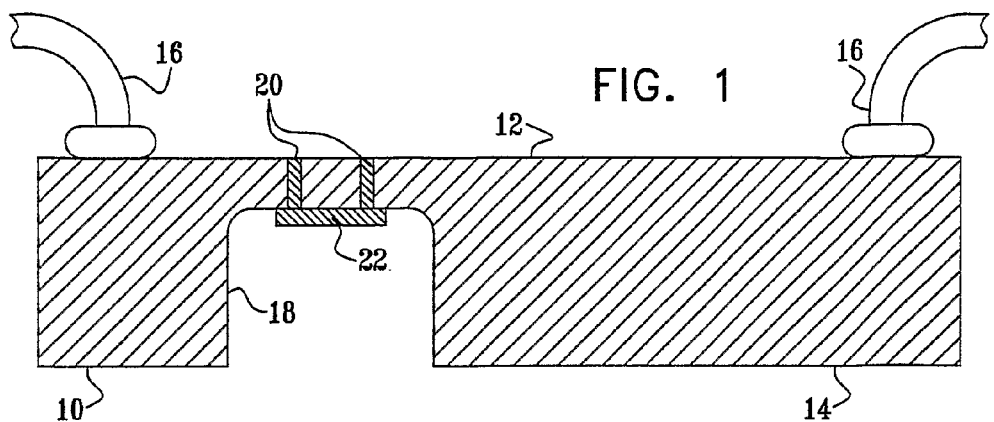
FIG. 1 is a cross-sectional view of a chip undergoing focused ion beam (FIB) attack.
Figure 2:
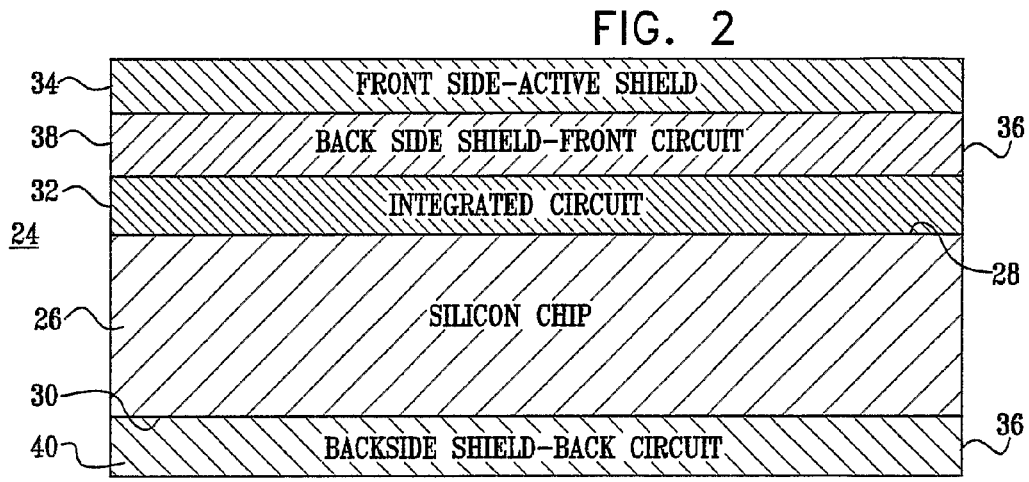
FIG. 2 is a cross-sectional view of a chip security system constructed and operative in accordance with a preferred embodiment of the present invention.

Reference is now made to FIG. 2, which is a cross-sectional view of a chip security system 24 constructed and operative in accordance with a preferred embodiment of the present invention. The chip security system 24 is generally for protecting a chip 26 from backside attack. The chip 26 is typically a silicon chip. However, it will be appreciated by those ordinarily skilled in the art that the system and method of the present invention can be implemented with any suitable chip material. The chip 26 typically has a surface 28 and a surface 30 which is opposite the surface 28. The surface 28 preferably includes an integrated circuit 32 disposed thereon. The terminology "disposed thereon" is used for the sake of simplicity. However, it will be appreciated by those skilled in the art of integrated circuit manufacture, that integrated circuits are typically formed partially within the chip material, for example, but not limited to, by doping the chip material, and partially on top of the chip material, typically in metal and insulating layers. However, the term "disposed thereon" as used in the specification and claims is defined to include disposed thereon and/or therein the surface.

The integrated circuit 32 is preferably protected by an active shield 34 (shown as "Front side active shield" in FIG. 2). An active shield as used in the specification and claims is defined as a defensive system with built-in constraints to limit or prevent access to an underlying circuit which is being protected by the active shield.

The active shield 34 typically includes a physical shield (not shown) such that breach of the physical shield leads to an action performed on the integrated circuit 32 that the active shield 34 is protecting. The action performed typically includes resetting the integrated circuit 32, but in any case acts to prevent the breach being exploited to gain some advantage from the breach.

The chip security system 24 also preferably includes a backside shield 36 having a front circuit 38 and a back circuit 40. The front circuit 38 is typically disposed on the surface 28. The back circuit 40 is typically disposed on the surface 30. Communication between the front circuit 38 and the back circuit 40 is preferably via a wireless link described in more detail with reference to FIGS. 4-9. Physical shielding is preferably performed by the back circuit 40. Detecting a breach is typically performed by a combination of the front circuit 38 and the back circuit 40. The front circuit 38 typically performs an action on the integrated circuit 32, such as resetting the integrated circuit 32 if a breach is detected.

Figure 3:
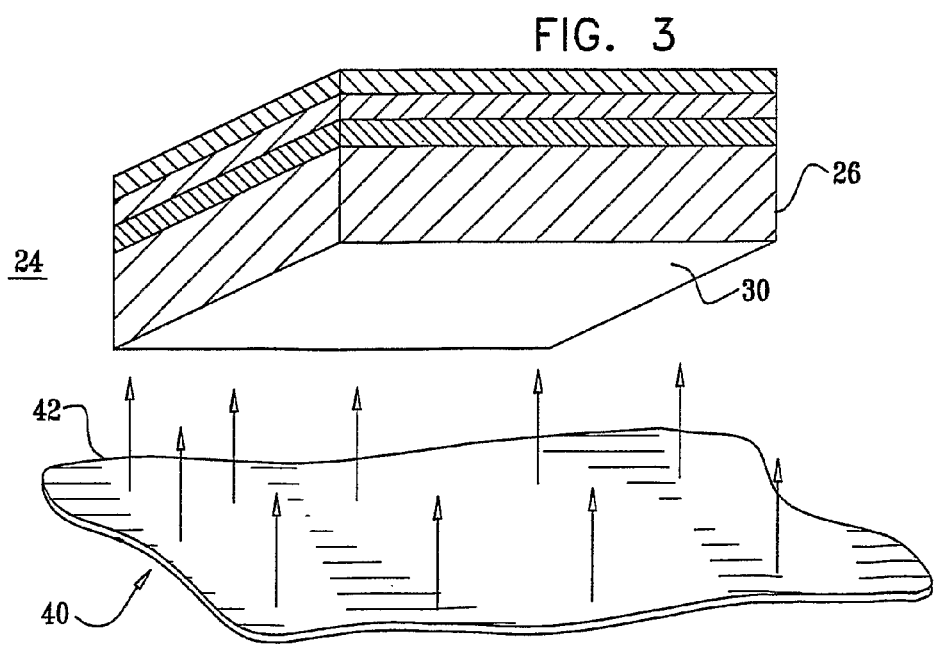
FIG. 3 is an orthogonal view of a backside shield back-circuit of the system of FIG. 2 being formed on a thin film attached to a chip.

Reference is now made to FIG. 3, which is an orthogonal view of the back-circuit 40 of the system 24 of FIG. 2 formed on a film 42 attached to the chip 26. In accordance with the most preferred embodiment of the present invention the back circuit 40 is formed on the film 42. The film 42 is preferably then mechanically connected, typically using a suitable adhesive, to the surface 30. Techniques for forming circuits on films are known to those skilled in the art.

The thin film 42 is typically a plastic film, for example, but not limited to, a polyester film such as Mylar, which is commercially available from DuPont Teijin Films U.S. Limited Partnership, 1 Discovery Drive, P.O. Box 411, Hopewell, Va. 23860 USA.

However, it will be appreciated by those ordinarily skilled in the art that the back circuit 40 can be formed directly on the surface 30 of the chip 26 for example, but not limited to, using lithographic and other suitable integrated circuit formation techniques.

Using the thin film 42 instead of forming the back circuit 40 directly on to the chip 26 is believed by the inventors to be more compatible with existing chip products.

Figure 4:
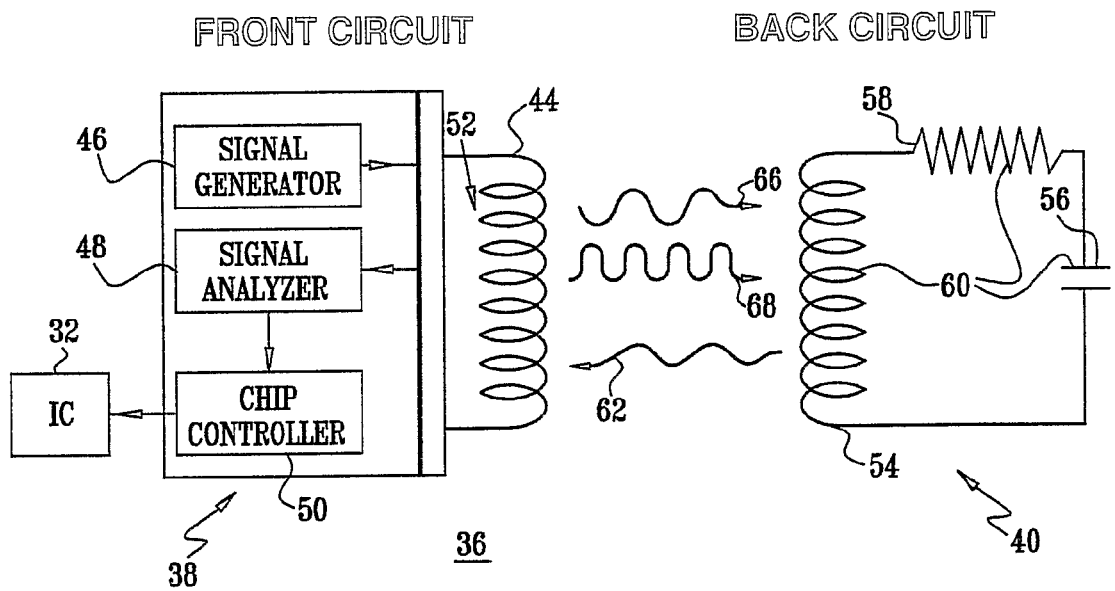
FIG. 4 is a simplified circuit diagram of a backside shield of the system of FIG. 2.

Reference is now made to FIG. 4, which is a simplified circuit diagram of the backside shield 36 of the chip security system 24 of FIG. 2.

The front circuit 38, which is disposed on the surface 28, preferably includes an antenna 44, a signal generator 46, a signal analyzer 48 and a chip controller 50. The signal generator 46 and the signal analyzer 48 are preferably operationally connected to the antenna 44, typically via a direct non-wireless connection. The signal analyzer 48 is preferably operationally connected to the chip controller 50, typically via a direct non-wireless connection. The chip controller 50 is preferably operationally connected to the integrated circuit 32, typically via a direct non-wireless connection.

Figure 5:
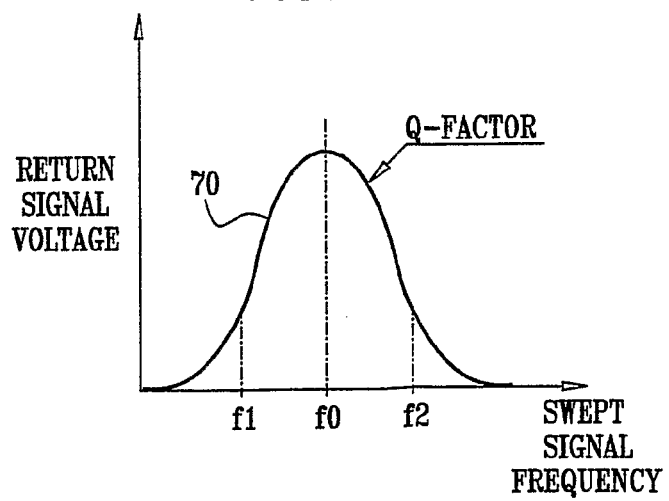
FIG. 5 is a graph of return signal voltage against swept signal frequency for the backside shield of FIG. 4.

Reference is additionally made to FIG. 5, which is a graph of return signal voltage against swept signal frequency for the backside shield of FIG. 4.

The signal generator 46 is generally operative to supply an outbound signal 52 for transmission by the antenna 44. The outbound signal 52 is typically a radio-frequency signal. The outbound signal 52 preferably includes a fixed frequency signal 66 having a frequency of $f_0$ and a swept frequency signal 68 which varies from frequency $f_1$ to frequency $f_2$ about $f_0$. The fixed frequency signal 66 generally has a main function of transmitting power to the back circuit 40. The swept frequency signal 68 is generally used for an analysis function, described below in more detail. The significance of $f_1$, $f_2$ and $f_0$ is described below in more detail with reference to the back circuit 40.

The back circuit 40 is preferably disposed on the surface 30. The back circuit 40 typically includes passive circuit components including an antenna 54, a capacitor 56 and a resistor 58. The back circuit 40 preferably excludes active circuit components. One of the advantages of using passive components, and not active components, is that the manufacture of the back circuit 40 is much simpler.

The term "passive component", as used in the specification and claims, is defined as: a component that does not require a power supply to handle the signals that pass through the component and: a component wherein the basic character of the component does not change when an electrical signal is applied.

The term "active component", as used in the specification and claims is defined as: a component wherein the basic characteristics of the component can change in a powered electrical circuit, for example, to perform amplification or to allow multiple switching of signals.

The back circuit 40 is generally operative to respond to the outbound signal 52 thereby transmitting a return signal 62 wirelessly from the antenna 54 to the antenna 44. The back circuit 40 is a resonant circuit, which generally includes the capacitor 56 and the resistor 58 and an inductor in the form of the antenna 54. The back circuit 40 has an associated resonant frequency, $f_0$.

The response of the return signal 62 to the swept frequency signal 68 is shown by way of example in FIG. 5. The amplitude 70 of the return signal 62 generally varies according to the frequency of the swept frequency signal 68 of the outbound signal 52. The amplitude 70 of the return signal 62 is typically a maximum when the swept frequency signal 68 is at the resonant frequency, $f_0$.

In accordance with an alternative preferred embodiment of the present invention, the outbound signal 52 includes a range of frequencies (at the same time) so that the swept frequency signal 68 is not needed in order to obtain the Q-factor. The outbound signal 52 including the range of frequencies is typically formed by the signal generator 46 generating white noise (even spread of power throughout the spectrum). The return signal 62 is not a white noise signal, but the return signal 62 has a spectrum whose basic shape is a bell curve.

The return signal 52 generally has a quality factor (Q-factor), which is a measure of the sharpness of the resonant frequency peak. The terms "resonant frequency" and "Q-factor" are known to those ordinarily skilled in the art of electronic engineering. The resonant frequency is typically defined by the inductance and capacitance of the circuit. The Q-factor is typically defined by the inductance, capacitance and resistance of the circuit.

The frequencies $f_1$ and $f_2$ are typically selected where the amplitude 70 is half the maximum amplitude. In other words, $f_1$ and $f_2$ are a standard deviation away from $f_0$. The frequency range must be high enough to allow efficient coupling between the antenna 44 and the antenna 54, but low enough such that conventional CMOS technology, typically used in smart cards, may be used.

The antenna 54, the capacitor 56 and the resistor 58 generally form a shielding arrangement 60 to shield the surface 30. In particular, the resistor 58 is preferably formed in a serpentine path over most of the surface 30. The shielding arrangement 60 is described in more detail with reference to FIG. 6.

A breach in the shielding arrangement 60 generally results in a change in, or cessation of the return signal 62. For example, partially cutting the shielding arrangement 60 may cause a change in the resonant frequency and/or the Q-factor depending upon which of the elements of the shielding arrangement 60 are affected. For example, if the antenna 54 or the capacitor 56 is affected, both the resonant frequency and the Q-factor are likely to change. If the resistor 58 is affected, the Q-factor is likely to change.

The term "breach" as used in the specification and claims is defined as partially cutting or fully severing a part of the shielding arrangement 60.

As the outbound signal 52 generally includes the swept frequency signal 68 which is a variable frequency signal, the return signal 62 will be a variable (changing) signal even if no breach has occurred. Therefore, a partial cutting in the shielding arrangement 60 may cause a change in the return signal 62 as compared to a prior sweep of the swept frequency signal 68.

The return signal 62 is typically received in the front circuit 38 by the antenna 44. The return signal 62 is preferably analyzed by the signal analyzer 48. The signal analyzer 48 typically converts the return signal 62 to a digital signal prior to analysis. The signal analyzer 48 is generally operative to detect a breach in the shielding arrangement 60 from a change in, or cessation of the return signal 62. In particular, the signal analyzer 48 typically analyzes a change in the resonant frequency and the Q-factor of the return signal 62 in order to detect the breach in the shielding arrangement 60. As the outbound signal 52 is a swept frequency signal, the signal analyzer 48 preferably compares the return signal 62 of the current sweep to the return signal 62 a prior sweep.

The resonant frequency and Q-factor are examples of electromagnetic properties that may be used to detect a breach in the shielding arrangement 60. It will be appreciated by those ordinarily skilled in the art that other suitable electromagnetic properties of the return signal 62 may be analyzed in order to detect a breach in the shielding arrangement 60, particularly parameters that are stable over temperature changes and time such as observing the phase of the signal over time.

The chip controller 50 is generally operative to perform an action on the integrated circuit 32, typically including resetting the integrated circuit 32, in response to the detection of the breach by the signal analyzer 48.

It should be noted that it is important that an attacker cannot mimic the back circuit 40. A conceivable attack could be to characterize the back circuit 40, and then place an imitation circuit on top of the back circuit 40, leaving the back of the chip 26 vulnerable to attack. The proposed attack could be countered by individualizing the back circuits 40, preferably randomly.

It will be appreciated by those ordinarily skilled in the art that the active shield 34 may not be needed when a breach from the front side of the chip 26 can be detected by the front circuit 38, for example, but not limited to, ensuring that the antenna 44 of the front circuit 38 covers enough of the surface of the front circuit 38 such that a breach in the antenna 44 results in an action performed on the integrated circuit 32.

Figure 6:
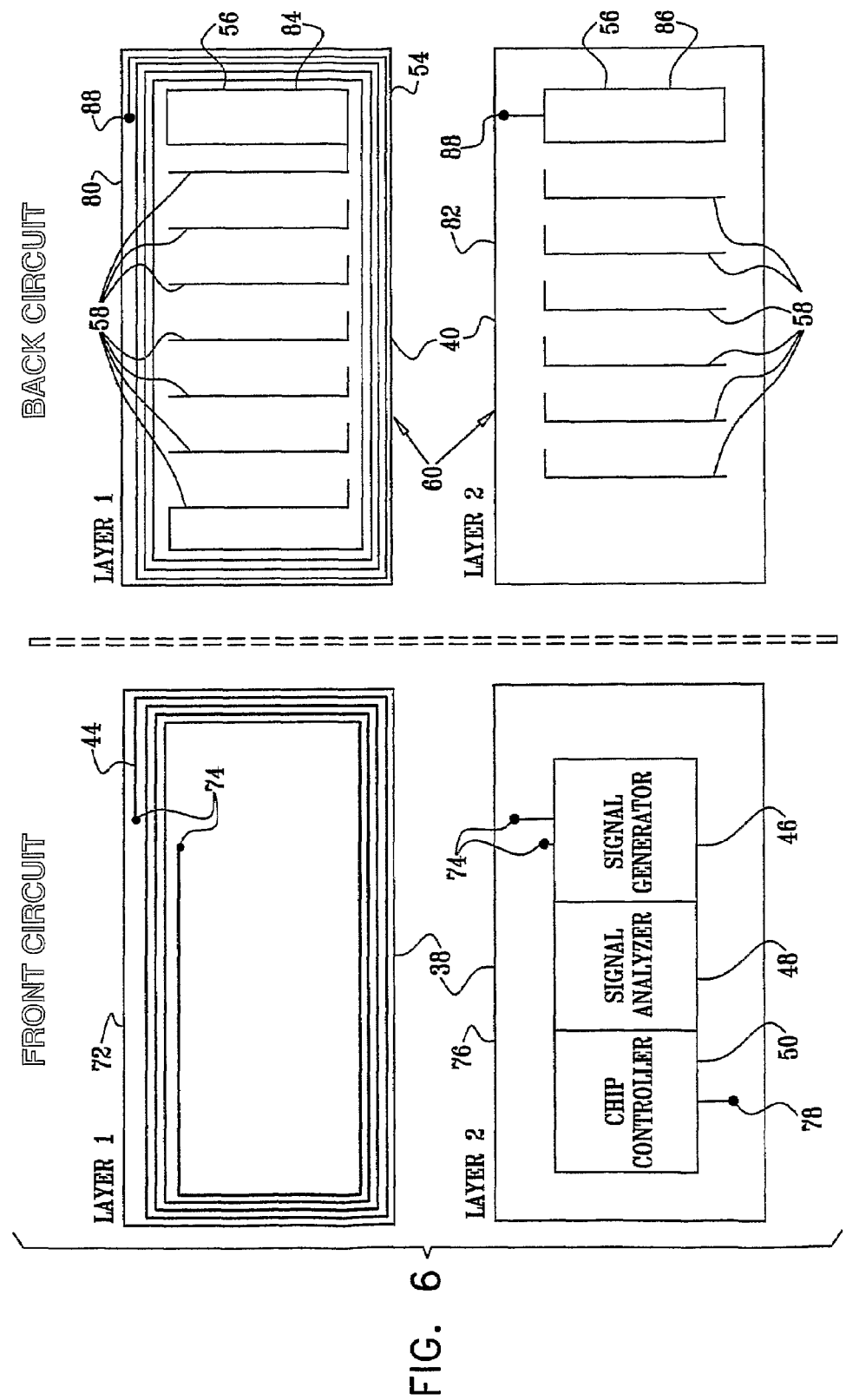
FIG. 6 is a simplified circuit layout view of the backside shield of FIG. 4.

Reference is now made to FIG. 6, which is a simplified circuit layout view of the backside shield 36 of FIG. 4.

The front circuit 38 is generally built in two or more layers including a top layer 72 and a bottom layer 76. The top layer 72 typically includes the antenna 44 which is formed around the perimeter of the top layer 72. The bottom layer 76 typically includes the signal generator 46, the signal analyzer 48 and the chip controller 50. The signal generator 46 and the signal analyzer 48 are generally connected to the antenna 44 via a plurality of pins 74 which extend from the top layer 72 to the bottom layer 76. The chip controller 50 is generally connected to the integrated circuit 32 via one or more pins 78.

It will be appreciated by those ordinarily skilled in the art of fabricating integrated circuits that the bottom layer 76 may be formed from sub-layers. Similarly, the top layer 72 may be formed from sub-layers. It will be appreciated by those ordinarily skilled in the art that some of the elements of the top layer 72 may be disposed in the bottom layer 76 and vice-versa.

Similarly, all circuit layouts shown in the specification may be formed from sub-layers, if practical, and the elements of each layer may be arranged differently than shown in the figures, as appropriate.

Similarly, the back circuit 40 is generally built in two or more layers including a top layer 80 and a bottom layer 82.

The top layer 80 typically includes the antenna 54, a top half 84 of the capacitor 56 and half the resistor 58. The antenna 54 is typically formed around the perimeter of the top layer 80 and is preferably aligned with the antenna 44 of the top layer 72 of the front circuit 38 for maximum coupling of the antenna 44 and the antenna 54.

The bottom layer 82 typically includes a bottom half 86 of the capacitor 56 and the other half of the resistor 58. The top half 84 and bottom half 86 of the capacitor 56 are preferably separated by a thin layer of dielectric material, preferably silicon dioxide.

The resistor 58 is typically divided into two sections such that adjacent strips of the resistor 58 are generally alternated between the bottom layer 82 and the top layer 80. Adjacent strips are preferably connected with pins (not shown) between the top layer 80 and the bottom layer 82. Dividing the resistor 58 between the top layer 80 and the bottom layer 82 generally allows the strips of the resistor 58 to be closer together, thereby providing a tighter arrangement for the shielding arrangement 60. The resistor 58 is preferably formed from aluminum tracks.

It will be appreciated by those ordinarily skilled in the art that similarly the antenna 54 can be divided between the top layer 80 and the bottom layer 82. The bottom half 86 of the capacitor 56 in the bottom layer 82 is typically connected to the antenna 54 in the top layer 80 via a pin 88.

The shielding arrangement 60 preferably includes the antenna 54, the capacitor 56 and the resistor 58.

The individual metal layers 80, 82 are preferably thinner than conventional metal layers in order to increase the resistance of the tracks of the resistor 58. The thickness of the metal layers is typically in the order of 100 nanometers.

It should be noted that the shielding arrangement 60 does not need to cover the whole surface of the surface 30 of the chip 26. The shielding arrangement 60 typically only needs to cover enough of the surface 30 in order to prevent an attack. By way of a non-limiting example, backside FIB edits require a large hole to be milled for access. A section of the chip 26 of at least 50 microns by 50 microns generally needs to be opened. Therefore, the strips of the shielding arrangement 60, preferably comprised of the antenna 54, the capacitor 56 and the resistor 58, are generally designed taking potential attacks into consideration. However, it may be prudent to plan ahead for more advanced attack techniques and make the strips of the shielding arrangement 60 closer together than the minimum design requirement.

The process to form the front circuit 38 and the back circuit 40 is generally described below.

First, a wafer, typically a silicon wafer, is preferably made as thin as possible. The bottom surface of the wafer is generally polished flat. However, the bottom surface does not need to be as perfect as the top surface.

Second, the front circuit 38 is generally formed on, and/or in, the top surface of the wafer. The front circuit 38 is typically formed using conventional integrated circuit techniques as known to those ordinarily skilled in the art of producing integrated circuits.

Third, on the back surface, a thin layer of silicon oxide is generally deposited. The silicon dioxide layer insulates the back circuit 40 from the silicon substrate.

Fourth, Infrared microscopy is preferably used to align to the back circuit 40 with the front circuit 38. A laser is then typically used to cut alignment marks into the substrate.

Fifth, conventional photolithography techniques are generally used to define the first metal layer, the bottom layer 82, which is typically aligned using the laser cut marks.

Then, an interlayer dielectric material is preferably deposited on top of the bottom layer 82.

Next, the second metal layer, the top layer 80, is formed on top of the interlayer.

Finally, the top layer 80 is preferably covered with a layer of silicon dioxide and silicon nitride for surface passivation.

It should be noted that precise alignment of the back circuit 40 and the front circuit 38 is not necessary, and generally not preferred, as process variations make it more difficult for an attacker to emulate the action of the back circuit 40. In fact, the process preferably includes random variations built in, in order to prevent copying the parameters of the back circuit 40 for attacking another device.

The signal analyzer 48 of the front circuit 38 is preferably taught the parameters to accept during initial testing.

Reference is now made to FIG. 7, which is a simplified circuit diagram of an alternative preferred backside shield 90 for use with the chip security system 24 of FIG. 2. The backside shield 90 typically includes a front circuit 92 and a back circuit 94. The front circuit 92 is preferably disposed on the surface 28. The back circuit 94 is preferably disposed on the surface 30.

The front circuit 92 typically includes an antenna 96, a signal generator 98, a signal analyzer 100 and a chip controller 102. The signal generator 98 and the signal analyzer 100 are preferably operationally connected to the antenna 96, typically via a direct non-wireless connection. The signal analyzer 100 is preferably operationally connected to the chip controller 102, typically via a direct non-wireless connection. The chip controller 102 is preferably operationally connected to the integrated circuit 32, typically via a direct non-wireless connection.

The signal generator 98 is typically operative to supply an outbound signal 104 for transmission by the antenna 96. The outbound signal 104 is typically a radio-frequency signal. The outbound signal 104 is preferably a fixed frequency signal which transmits power to the back circuit 94 via induction.

The back circuit 94 typically includes an antenna 106, a rectifier 108, a checker 110, a shielding arrangement 112 and a reporter 114. The back circuit 94 preferably includes active circuit components typically included in the rectifier 108, the checker 110 and the reporter 114. The rectifier 108 and the reporter 114 are generally operationally connected to the antenna 106. The checker 110 is preferably operationally connected to the rectifier 108, the reporter 114 and the shielding arrangement 112.

The back circuit 94 is preferably formed on the thin film 42 (FIG. 3) which is then connected to the chip 26, for example, using adhesive. However, it will be appreciated by those ordinarily skilled in the art that the back circuit 94 may be formed in, and/or on, the chip 26 during chip manufacture.

The antenna 106 preferably wirelessly receives the outbound signal 104 transmitted by the antenna 96 thereby providing power to the back circuit 94. For many applications, it should be noted that the frequency of the outbound signal 104 is preferably high enough to allow efficient coupling between the antennas 96, 106, but low enough such that conventional CMOS technology, typically used in smart cards, may be used.

The rectifier 108 preferably rectifies the outbound signal 104 received by the antenna 106 in order to provide a direct current (DC) power supply to the checker 110 and reporter 114.

The checker 110 is generally operative to check the integrity of the shielding arrangement 112 by checking for a breach in the shielding arrangement 112. The shielding arrangement 112 is described in more detail with reference to FIG. 9.

The term "breach" as used in the specification and claims is defined as partially cutting or fully severing a part of the shielding arrangement 112.

The checker 110 and the shielding arrangement 112 are typically formed in a similar way to a front surface active shield known to those skilled in the art.

The reporter 114 preferably reports back to the signal analyzer 100 on the integrity of the shielding arrangement 112 using a return signal 118 via the antenna 106 and the antenna 96.

In accordance with the most preferred embodiment of the backside shield 90, the reporter 114 typically only sends the return signal 118 when the checker 110 has not detected a breach in the shielding arrangement 112. However, if the checker 110 detects a breach in the shielding arrangement 112, the reporter 114 typically does not send back the return signal 118. Therefore, detection of a breach in the shielding arrangement 112 by the checker 110 typically results in a cessation of the return signal 118.

In accordance with an alternative preferred embodiment of the backside shield 90, the reporter 114 changes the return signal 118 depending on the integrity status of the shielding arrangement 112. Therefore, detection of a breach in the shielding arrangement 112 typically results in a change in the return signal 118.

The return signal 118 is typically received in the front circuit 92 by the antenna 96. The return signal 118 is preferably analyzed by the signal analyzer 100. The signal analyzer 100 typically converts the return signal 118 to a digital signal prior to analysis. The signal analyzer 100 is generally operative to detect a breach in the shielding arrangement 112 from a change in, or cessation of the return signal 118.

The return signal 118 is typically a pulsed signal whereby the reporter 114 sends a periodic pulse to the signal analyzer 100. Alternatively, the return signal 118 is a continuous signal formed by amplitude or frequency modulating the outbound signal 104.

The chip controller 102 is preferably operative to perform an action on the integrated circuit 32, typically resetting the integrated circuit 32, in response to the detection of the breach by the signal analyzer 100.

Reference is now made to FIG. 8, which is a simplified circuit layout view of the front circuit 92 of the backside shield 90 of FIG. 7. The front circuit 92 is typically formed in a plurality of layers 120 in substantially the same way that the front circuit 38 is formed, as described with reference to FIG. 6.

Figure 9:
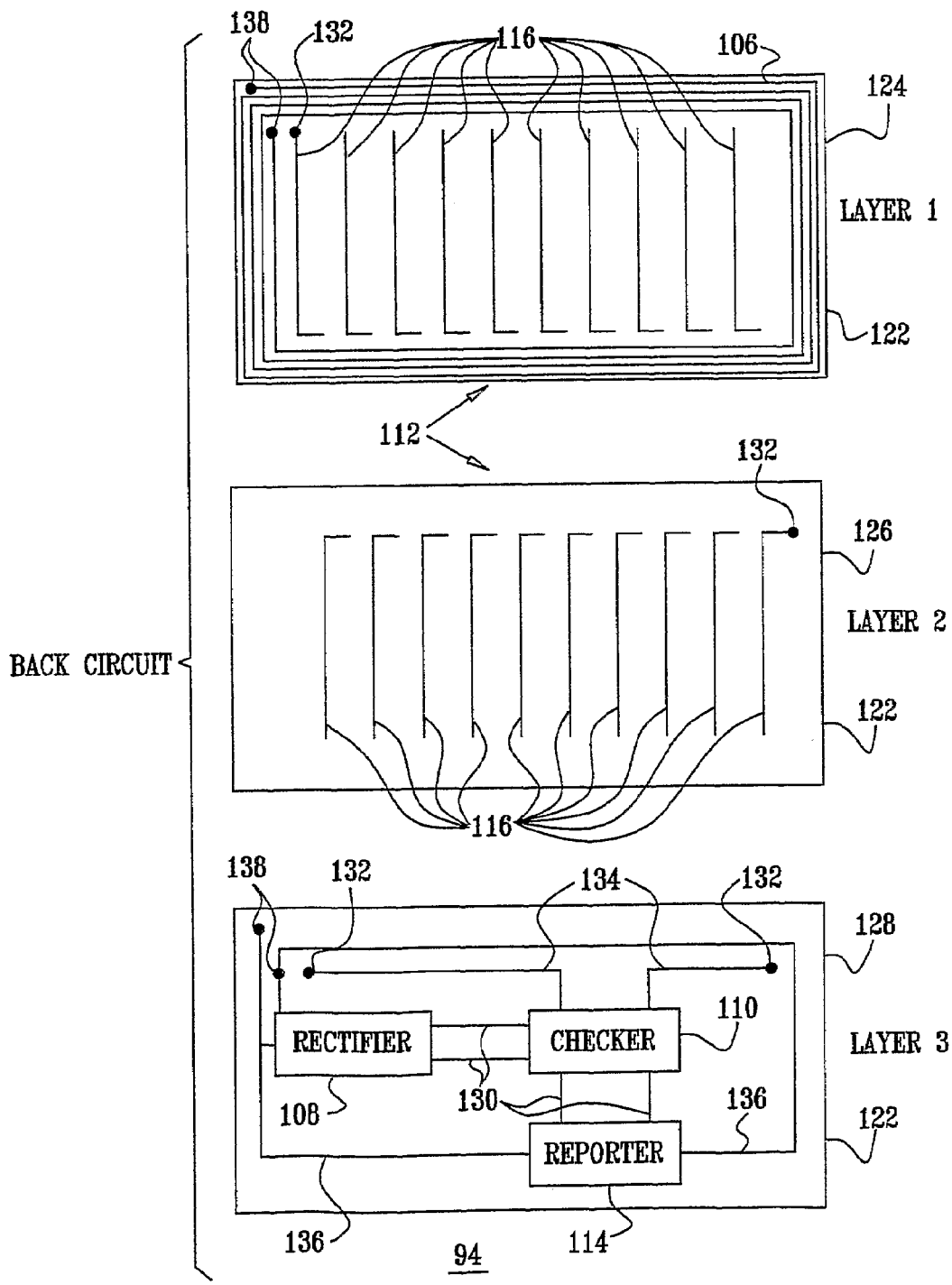
FIG. 9 is a simplified circuit layout view of a back circuit of the backside shield of FIG. 7.

Reference is now made to FIG. 9, which is a simplified circuit layout view of the back circuit 94 of the backside shield 90 of FIG. 7. The back circuit 94 is typically formed from three or more layers 122.

The shielding arrangement 112 is typically formed by the antenna 106 and a serpentine path shield 116. A top layer 124 of the layers 122 generally includes the antenna 106 and one half of the shield 116. A middle layer 126 of the layers 122 generally includes the other half of the shield 116. The shield 116 is preferably formed of adjacent strips substantially the same as the resistor 58 of FIG. 6. A bottom layer 128 of the layers 122 typically includes the rectifier 108, the checker 110 and the reporter 114. The rectifier 108, the checker 110 and the reporter 114 are preferably connected to each other using a plurality of metal strips 130. The checker is typically connected to the shield 116 in the top layer 124 and the shield 116 in the middle layer 126 via two metal strips 134 and two pins 132. The rectifier 108 and the reporter 114 are generally connected to the antenna 106 via a plurality of metal strips 136 and two pins 138.

It should be noted that the back circuit 94 and the front circuit 92 (FIG. 8) do not generally need to be precisely aligned with each other. The margin of error is typically in the order of 10's of microns. Larger variations are acceptable if the actual acceptable range can be programmed after the back circuit 94 has been aligned. The transistors of the back circuit 94 are preferably made in polycrystalline silicon in substantially the same way that transistors are formed for use in thin-film transistor (TFT) displays, thereby reducing cost and complexity.

Figure 10:
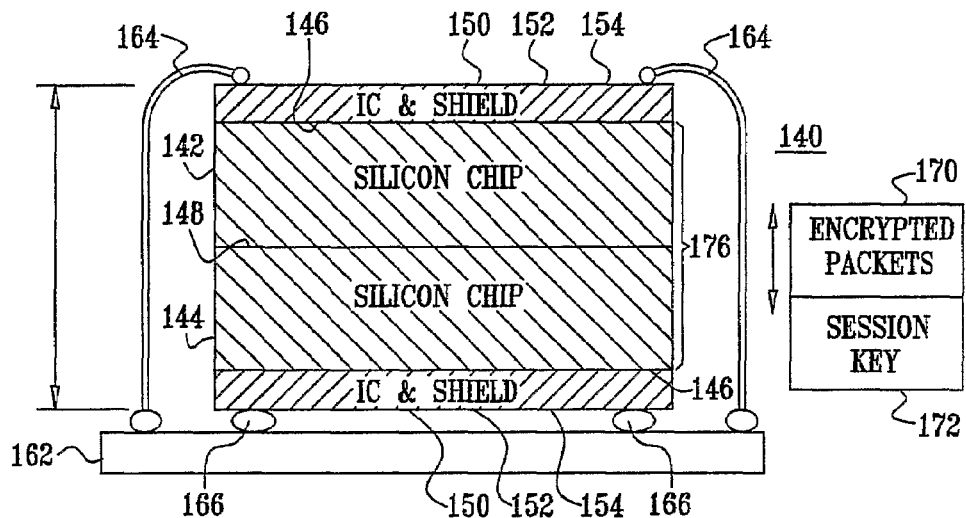
FIG. 10 is a cross-sectional view of a dual-chip security system constructed and operative in accordance with a preferred embodiment of the present invention.
Figure 11:
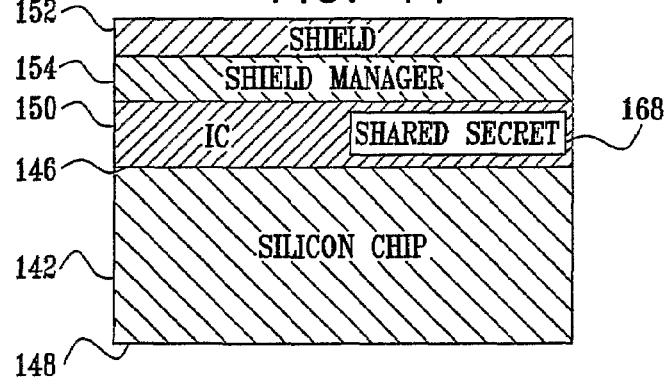
FIG. 11 is an expanded cross-sectional view of one of the chips of the dual-chip security system of FIG. 10.
Figure 12:
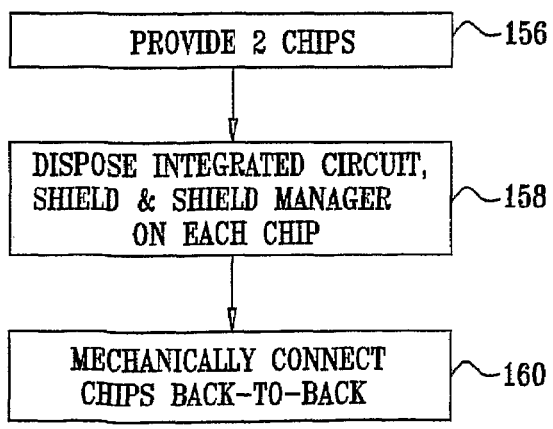
FIG. 12 is a flow chart showing the preferred steps of manufacture of the dual-chip security system of FIG. 10.

Reference is now made to FIGS. 10-12. FIG. 10 is a cross-sectional view of a dual-chip security system 140 constructed and operative in accordance with a preferred embodiment of the present invention. The dual-chip security system 140 preferably includes two chips, a chip 142 and a chip 144. FIG. 11 is an expanded cross-sectional view of the chip 142 of the dual-chip security system 140 of FIG. 10. FIG. 12 is a flow chart showing the preferred steps of manufacture of the dual-chip security system 140 of FIG. 10.

Each of the chips 142, 144 typically has a surface 146 and a surface 148 opposite the surface 146 (block 156). Each chip 142, 144 is typically formed from a thinned out piece of silicon. The thickness of the chips 142, 144 together is preferably between 200 microns and 400 microns. The surface 146 of each chip 142, 144 typically has disposed thereon an integrated circuit 150, a shield 152 and a shield manager 154 (block 158). The shield manager 154 is typically implemented as part of the integrated circuit 150. The shield manager 154 is preferably operative to check integrity of the shield 152 and to perform an action on the integrated circuit 150 in response to detecting a breach in the shield 152. The shield 152 and shield manager 154 is preferably implemented as an active shield. Those ordinarily skilled in the art of chip protection know how to produce active shields for integrated circuits. The shield 152 is typically formed in the top layer of metal interconnects of each chip 142, 144.

The chip 142 and the chip 144 are generally mechanically connected together, preferably by direct bonding, via the surface 148 of each chip 142, 144. In other words, the chips 142, 144 are preferably connected back-to-back with the integrated circuit 150, shield 152 and shield manager 154 facing outwards (block 160). Therefore, the chips 142, 144 form a single chip arrangement 176 where the surfaces 146 of each chip 142, 144 are substantially parallel to each other on opposite sides of the chip arrangement 176.

The surface 148 of each chip typically includes a silicon dioxide layer which is thickened and then bonded by applying voltage between the chips 142, 144. The applied voltage generally bonds the oxide into a single layer. Once the chips 142, 144 have been bonded, the chips 142, 144 cannot be separated without typically destroying the integrated circuits 150 of the chips 142, 144.

The bonding is preferably performed by argon beam surface activation bonding. The article entitled "Aligned room-temperature bonding of silicon wafers in vacuum by argon beam surface activation" by Hideki Takagi and Ryutaro Maeda in the Journal of Micromechanics and Microengineering on pages 290-295, volume 15, published by the Institute of Physics Publishing, UK describes a particularly useful process for bonding wafers. The technique described has a number of advantages. First, the technique is room-temperature, making the technique compatible with integrated circuit wafers. Second, the technique offers good alignment of approximately 2 microns between wafers. Additionally, no special surface preparation is needed and high voltages are not required thereby minimizing the risk of static discharge damage.

The chip 144 is preferably mounted flip-chip on a substrate 162 using a plurality of contact pads 166 thereby allowing the whole area of the surface 146 to be used for connecting to the substrate 162. The chip 142 is typically electrically connected to the substrate 162 via a plurality of ball-bond connections 164. Therefore, the integrated circuit 150 of each of the chips 142, 144 is electrically connected via the substrate 162.

Communication between the integrated circuit 150 of the chip 142 and the integrated circuit 150 of the chip 144 is preferably encrypted, typically using packets 170 encrypted with a session key 172. The integrated circuit 150 of each of the chips 142, 144 preferably includes a secret 168 shared by the chips 142, 144 for use in the encrypted communication. The secret 168 on the chip 142 is preferably different from the secret 168 on the chip 144. Additionally, the secret 168 of each chip 142, 144 is typically shared between the two chips 142, 144 making it necessary to reverse engineer both chips 142, 144 to usefully attack the chip.

Security concerns may be effectively carried out as above using inductive coupling for wirelessly communicating between the chips.

The dual-chip security system 140 has additional advantages over the security advantage of backside protection. First, a manufacturer which makes a range of devices with common features, such as, the same core and operating system, the manufacturer could have different memory configurations or different customer ROM codes by changing one side of the chip only, thereby saving development time and cost. Second, the amount of circuit area may be doubled without increasing the length and width of the chip. For example, smart card chips are generally limited to 5 mm by 5 mm.

Figure 13:
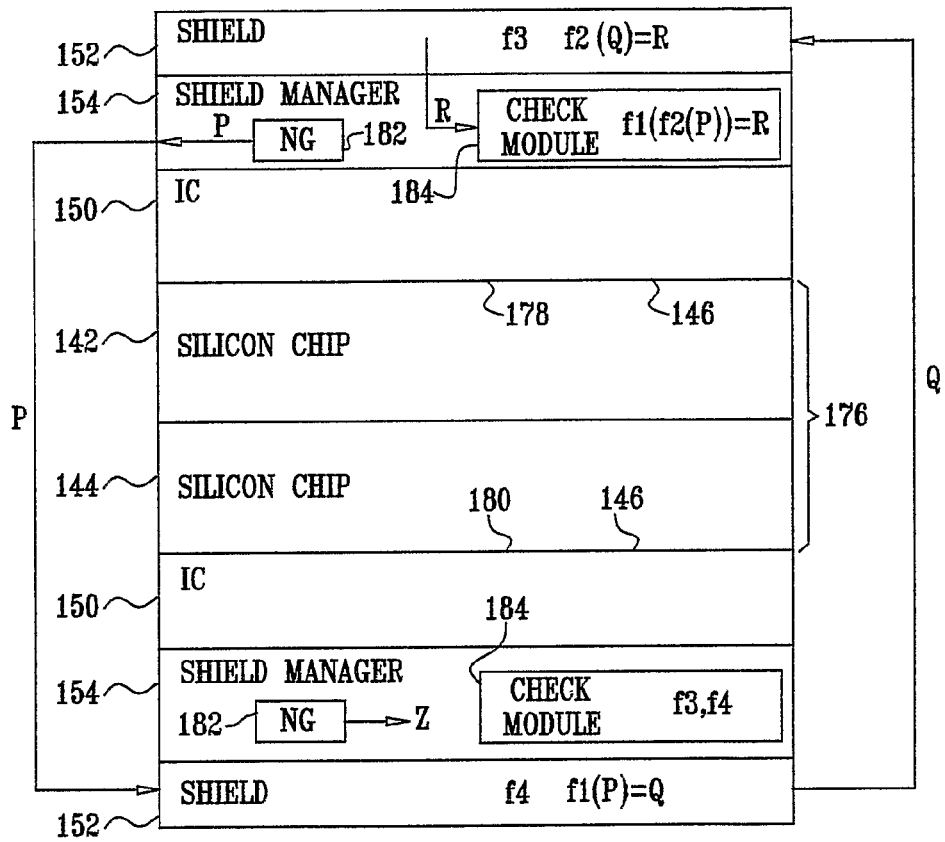
FIG. 13 is a cross-sectional view of the dual-chip security system of FIG. 10 having an inter-shield checking subsystem.

Reference is now made to FIG. 13, which is a cross-sectional view of the dual-chip security system 140 of FIG. 10 having an inter-shield checking subsystem 174. The inter-shield checking subsystem 174 is preferably operative such that if either of the shields 152 is breached as determined by the shield managers 154 then an action is typically performed on both integrated circuits 150, such as chip reset of both integrated circuits 150, in response to detection of the deemed breach. The operation of the inter-shield checking subsystem 174 is preferably performed by the shields 152, the shield managers 154 and the integrated circuits 150, as will now be described below.

In order to simplify the description, the surfaces 146 of the chips 142, 144 are now described as a top surface 178 and a bottom surface 180 of the chip arrangement 176. The top surface 178 is the surface 146 of the chip 142. The bottom surface 180 is the surface 146 of the chip 144.

Each shield manager 154 is typically operationally connected to each of the shields 152 and the integrated circuit 150 adjacent to the shield manager 154. Each shield manager 154 is generally operationally connected to the shield 152 on the other side of the chip arrangement 176 via ball-bond connections 164, substrate 162 and contact pads 166 (FIG. 10). It will be appreciated by those ordinarily skilled in the art that the shield managers 154 and/or shields 152 may be directly connected to each other via any suitable wired and/or wireless connection or indirectly connected via another element such as one or both of the integrated circuits 150.

Each shield manager 154 typically includes a number generator for generating a number, or preferably a random-number generator for generating a random number, or most preferably a pseudo-random number generator or a true-random number generator for generating a pseudo-random number or a true-random number, respectively. Additionally, each shield manager 154 generally includes a check module 184. The operation of the check modules 184, as well as the other aspects of the inter-shield checking subsystem 174, is now described below. In order to simplify the description, the inter-shield checking subsystem 174 is described with reference to the shield manager 154 disposed on the top surface 178.

The number generator 182 of the shield manager 154 disposed on the top surface 178 is typically operative to generate a number P. The shield manager 154 disposed on the top surface 178 is generally operative to send the number P to the shield 152 disposed on the bottom surface 180. The shield 152 disposed on the bottom surface 180 is preferably operative to perform a function f1 on the number P yielding a value Q if the shield 152 disposed on the bottom surface 180 is intact. The function f1 is preferably performed by the shield 152 disposed on the bottom surface 180 as a result of the physical wiring of the shield 152 disposed on the bottom surface 180. If the wiring is breached, then the function f1 is preferably automatically not performed and therefore the value Q is generally not yielded from the value P. The value Q is generally routed (typically by direct wiring) to the shield 152 disposed on the top surface 178 so that the shield 152 disposed on the top surface 178 is preferably operative to receive the value Q. The shield 152 disposed on the top surface 178 is preferably operative to perform a function f2 on the value Q typically yielding a value R if the shield 152 disposed on the top surface 178 is intact. Similarly, the function f2 is preferably performed by the shield 152 disposed on the top surface 178 as a result of the physical wiring of the shield 152 disposed on the top surface 178. The value R is typically routed to the shield manager 154 disposed on the top surface 178.

The check module 184 of the shield manager 154 disposed on the top surface 178 is generally operative to perform the following functions.

First, receive the value R from the shield 152 disposed on the top surface 178.

Second, check the validity of the value R based on the number P by performing a calculation using the function f1 and the function f2, with the number P as input, for the calculation. The calculation is preferably f1(f2(P)). However, in accordance with an alternative preferred embodiment of the present invention, the check module 184 includes a look-up table including a plurality of input-output pairs mapping the possible values of P and R.

Third, compare the result of the calculation (or the value found in the look-up table) to the value R in order to determine the integrity of the shields 152. The shields 152 are typically deemed to be intact if the result of the calculation (or the value found in the look-up table) is equal to R.

The steps described above from the generation of P by the number generator 182 to the comparing by the check module 184 are preferably repeated periodically in order to determine the ongoing integrity of the shields 152. If the shield manager 154 disposed on the top surface 178 does not receive a timely value from the shields 152 or the step of comparing the result to the value R fails, then an action is generally performed on the integrated circuit 150 disposed on the top surface 178 by the shield manager 154 disposed on the top surface 178, such as chip reset or changing the content of non-volatile memories to affect the functions of the integrated circuit 150 (for example, but not limited to, making the integrated circuit 150 "remember" the event or setting a flag in a register that makes the integrated circuit 150 delete certain information such as cryptographic keys).

It should be noted that each of the shield managers 154 is typically implemented as part of the same integrated circuit as the associated integrated circuit 150.

It will be appreciated by those ordinarily skilled in the art that the number P can first be sent by the shield manager 154 disposed on the top surface 178 to the shield 152 disposed on the top surface 178 and then the value yielded is sent to the shield 152 disposed on the bottom surface 180.

In a similar fashion to the checking of the shields 152 by the shield manager 154 disposed on the top surface 178, the shield manager 154 of the bottom surface 180 preferably checks the shield 152 disposed on the top surface 178 and the shield 152 disposed on the bottom surface 180. The number generator 182 of shield manager 154 disposed on the bottom surface 180 is preferably operative to generate a number Z. The shield 152 disposed on the top surface 178 and the shield 152 disposed on the bottom surface 180 preferably perform the functions f3 and f4 if the shields 152 are intact, respectively, A new number (P or Z) is preferably generated each time a checking operation is performed by one of the shield managers 154.

In accordance with an alternative preferred embodiment of the present invention, the shield managers 154 check each of the shields 152 independently. By way of example only, the shield manager 154 disposed on the top surface 178 sends the value P to the shield 152 disposed on the bottom surface 180. The value Q yielded by the shield 152 disposed on the bottom surface 180 is routed to the shield manager 154 disposed on the top surface 178 for checking using the function f1 (or a look-up table). Additionally, the value P, or a different value, is sent by the shield manager 154 disposed on the top surface 178 to the shield 152 disposed on the top surface 178. The shield 152 disposed on the top surface 178 yields a value which is routed back to the shield manager 154 disposed on the top surface 178 for checking using the function f2 (or a look-up table). The shield manager 154 disposed on the bottom surface 180 checks the shields 152 independently in a similar manner to the checks performed by the shield manager 154 disposed on the top surface 178.

In accordance with another preferred embodiment of the present invention, the functions f1, f2, f3 and f4 are performed using a block cipher, for example, but not limited to, AES with a fixed key, wherein each of the functions f1, f2, f3 and f4 are preferably associated with different fixed keys. In accordance with yet another preferred embodiment of the present invention, the functions f1, f2, f3 and f4 are hash functions.

The chip arrangement 176 of the inter-shield checking subsystem 174 typically has two chips 142, 144, the two chips 142, 144 being mechanically connected back-to-back by direct bonding. However, it will be appreciated by those ordinarily skilled in the art that the inter-shield checking subsystem 174 may be implemented with other chip arrangements for example, but not limited to, non-back-to-back multi-chip arrangements such as piggy-back chip arrangements or with a chip arrangement including a sole chip such that the chip arrangement is formed from a single piece of material prior to the circuits being formed on the chip.

It will be appreciated that if the integrated circuit 150 disposed on the bottom surface 180 is not included, then the shield manager 154 disposed on the bottom surface 180 is typically not needed. The shield manager 154 disposed on the top surface 178 preferably checks the integrity of both the shields 152 using the methods described above.

Figure 14:
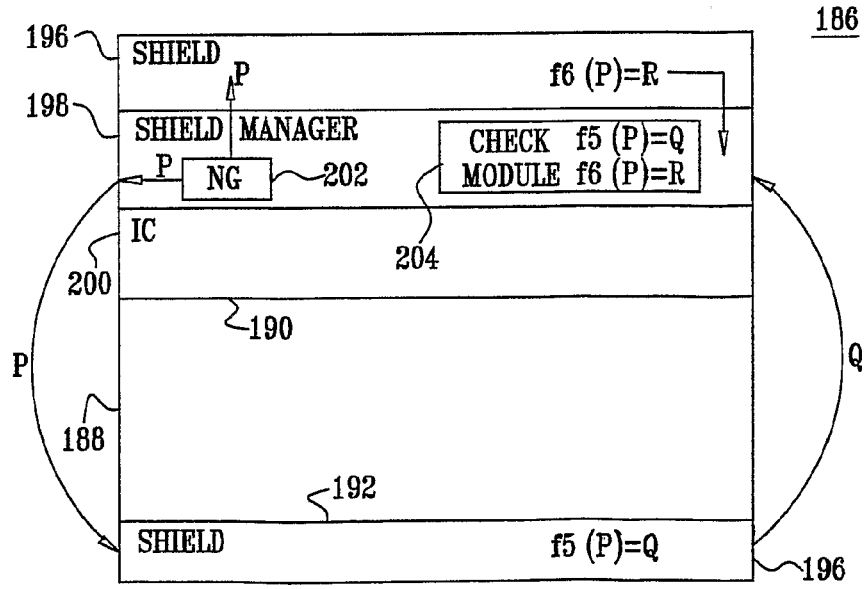
FIG. 14 is a cross-sectional view of a chip security system constructed and operative in accordance with an alternative preferred embodiment of the present invention.

Reference is now made to FIG. 14, which is a cross-sectional view of a chip security system 186 constructed and operative in accordance with an alternative preferred embodiment of the present invention. The chip security system 186 preferably includes a chip arrangement 188 having a top surface 190 and a bottom surface 192. The top surface 190 and the bottom surface 192 are typically substantially parallel to each other and preferably disposed on opposite sides of the chip arrangement 188.

The chip arrangement 188 preferably includes a sole chip such that the chip arrangement is formed from a single piece of material prior to the circuits being formed on the chip.

However, it will be appreciated by those ordinarily skilled in the art that chip security system 186 may be implemented with a plurality of chips mechanically connected to each other, preferably by direct bonding or with other chip arrangements for example, but not limited to, non-back-to-back multiple chip arrangements such as piggy-back chip arrangements.

The chip security system 186 typically includes a plurality of shields 196 and a shield manager 198. The shield manager 198 is typically disposed on the top surface 190. The shield manager 198 is generally operative to check integrity of the shields 196. One of the shields 196 is disposed on the top surface 190. Another of the shields 196 is disposed on the bottom surface 192.

The chip security system 186 also typically includes an additional integrated circuit 200 generally disposed on the top surface 190.

The shield manager 198 is preferably operationally connected to the shields 196 and the integrated circuit 200.

In accordance with the preferred embodiment of the chip security system 186, the chip security system 186 does not include an integrated circuit disposed on the bottom surface 192. However, it will be appreciated by those ordinarily skilled in the art that chip security system 186 can include an integrated circuit disposed on the bottom surface 192. The integrated circuit 200 is preferably operationally connected to the shield manager 198. The shield manager 198 is preferably operationally connected to the shields 196, typically via any suitable wired and/or wireless connection. The shield manager 198 typically includes a number generator 202 to generate a number P, or preferably a random-number generator for generating a random number, or most preferably a pseudo-random number generator or a true-random number generator for generating a pseudo-random number or a true-random number, respectively.

The shield manager 198 is generally operative to send test data to the shield 196 disposed on the bottom surface 192. The test data is preferably the number P. The shield 196 disposed on the bottom surface is typically operative to perform a function f5 (typically as a function of the wiring of the shield shields 196) on the test data yielding a value Q if the shield 196 disposed on the bottom surface 192 is intact. The value Q is preferably routed back to the shield manager 198. The shield manager 198 typically includes a check module 204 preferably operative to: receive the value Q; and perform an operation on the value Q in order to determine the integrity of the shield 196 disposed on the bottom surface 192. The operation performed by the check module 204 typically includes: performing a calculation using the function f5 with the number P as input for the calculation (or using a suitable look-up table); and comparing a result of the calculation (or the result found in the look-up table) to the value Q in order to determine the deemed integrity of the shield 196 disposed on the bottom surface 192.

In accordance with an alternative preferred embodiment of the present invention, the test data sent by the shield manager 198 is not equal to the number P, the test data being generated by the shield manager 198 based on the number P. For example, the test data is typically determined by the shield manager 198 using the number P as input to a function f7. The shield 196 disposed on the bottom surface 192 then generally performs a function f8 on the test data, the function f8 being an inverse function of f7, to yield P. The value P is then typically sent back to the shield manager 198 for comparing to the originally generated number.

The shield manager 198 preferably determines the deemed integrity of the shield 196 disposed on the top surface 190 by sending the number P to the shield 196 disposed on the top surface 190. The shield 196 disposed on the top surface 190 typically uses performs a function f6 on the number P, yielding a value R if the shield 196 disposed on the top surface 190 is intact. The value R is then preferably routed to the shield manager 198 which is operative to receive the value R. The shield manager 198 generally checks the value R by re-executing the function f6 with the number P (or by using a suitable look-up table).

In accordance with another preferred embodiment of the present invention, the functions f6 and f7 are performed using a block cipher, for example, but not limited to, AES with a fixed key, wherein each of the functions f6 and f7 are preferably associated with different fixed keys. In accordance with yet another preferred embodiment of the present invention, the functions f6 and f7 are hash functions.

Figure 16A:
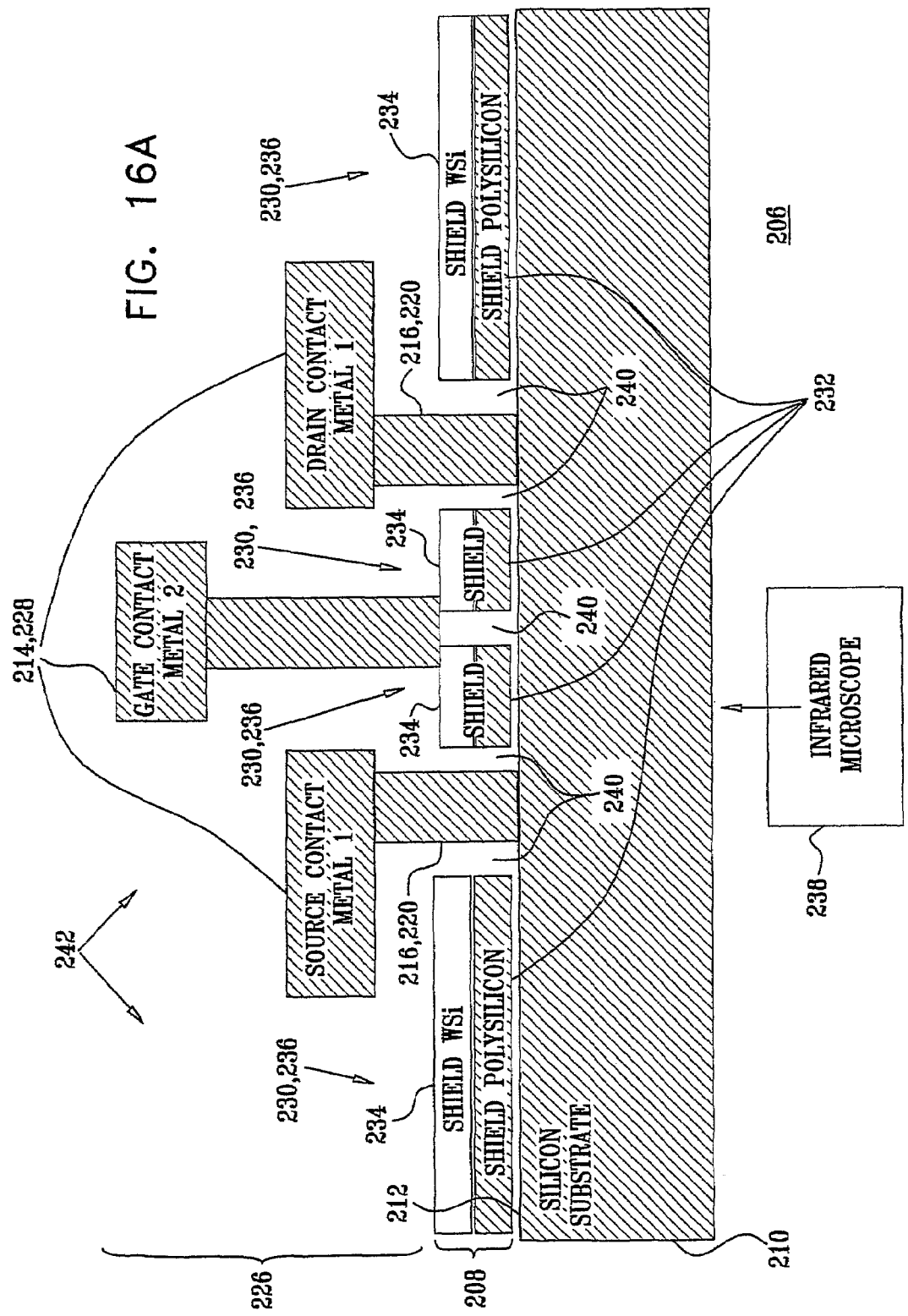
FIG. 16a is a cross-sectional view through the line XVIA of FIG. 15.

Reference is now made to FIGS. 15, 16a and 16b. FIG. 15 is a plan view of an integrated circuit protection system 206 constructed and operative in accordance with another alternative preferred embodiment of the present invention. FIG. 16a is a cross-sectional view through the line XVIA of FIG. 15. FIG. 16b is a cross-sectional view through the line XVIB of FIG. 15.

As discussed hereinabove, shield protection for security chips may be passive or active. A passive shield typically attempts to make attack more difficult but does not actively detect a breach and react in a way to stop the attack. Active shields generally detect and stop attack. The system 206 is preferably operative to provide a passive shield which uses a polycrystalline silicon (polysilicon) layer in a layer 208.

A polysilicon layer is typically present in many integrated circuit chips. Most integrated circuits use polycrystalline silicon for gate and other connections. Many integrated circuits, particularly those employing non-volatile memory, typically use two layers of polycrystalline silicon. It is also typical that at least one of the polycrystalline silicon layers is composed of a bilayer structure, the lower part of which is doped polycrystalline silicon and the upper part of which is a layer of a metal silicide, such as tungsten silicide. The metal silicide is applied as a method of reducing the sheet resistance of the bilayer stack.

An attack on the back-side of a chip typically uses techniques to find features to attack. The techniques are generally navigation schemes. One important and necessary navigation technique uses infra-red illumination and imaging to view, and therefore find, structures to attack. Attacks are typically performed using backside edit FIB machines with focused ion beam systems including an infrared camera as a navigation method. A backside edit FIB machine known as Vectravision is commercially available from FEI Company of 5350 NE Dawson Creek Drive, Hillsboro, Oreg. 97124, USA. Another backside edit FIB machine known as OptiFIB is commercially available from Credence Systems Corp., of 1421 California Circle Milpitas, Calif. 95035, USA.

It should be noted that the tungsten silicide is opaque to light, including near infrared, while silicon, including polycrystalline silicon, is not. Any open areas between the polycrystalline silicon bilayer structures and/or other circuit structures in the polysilicon layer allow IR navigation in the open areas, and therefore attack.

The system 206 typically obscures, and preferably blocks, a navigation device from viewing circuit features beyond the polysilicon layer such as metal interconnects by filling in all open areas, or selected open areas with a polycrystalline silicon bilayer material including a sub-layer of a metal silicide, such as tungsten silicide.

The system 206 is now described in more detail.

The system 206 preferably includes a silicon substrate 210 having a surface 212. The system 206 also preferably includes an integrated circuit 214 disposed on the surface 212 of the silicon substrate 210. The integrated circuit 214 typically includes the layer 208 which includes preferably a plurality of structures 216 typically including: one or more bilayer structures 218 (only one shown); and other structures such as a plurality of metal contacts 220. The bilayer structures 218 preferably include a polycrystalline silicon sub-layer 222 and a metal silicide sub-layer 224. The metal silicide sub-layer 224 is typically formed from tungsten silicide. It will be appreciated by those ordinarily skilled in the art that other suitable metal silicides may be used for the metal silicide sub-layer 224, for example, but not limited to tantalum silicide.

The integrated circuit 214 also includes a layer 226 including a plurality of metal elements 228. The layer 208 is closer to the surface 212 than the layer 226.

The system 206 also includes a shield arrangement 230 including a polycrystalline silicon sub-layer 232 and a metal silicide sub-layer 234. The metal silicide sub-layer 234 is typically formed from tungsten silicide. It will be appreciated by those ordinarily skilled in the art that other suitable metal silicides may be used for the metal silicide sub-layer 234, for example, but not limited to tantalum silicide.

The shield arrangement 230 typically includes a plurality of shield elements 236, each shield element 236 preferably including the polycrystalline silicon sub-layer 232 and the metal silicide sub-layer 234.

The shield arrangement 230 is preferably disposed in the layer 208 such that: the shield arrangement 230 does not perform an electronic function in the integrated circuit 214; and a view seen by an infrared microscope 238 beyond the layer 208 of integrated circuit features, such as one or more of the metal elements 228, is at least partially obscured, and preferably blocked, when the infrared microscope 238 images the integrated circuit 214 through the silicon substrate 210.

For the shield arrangement 230 to be effective, the shield arrangement 230 must preferably cover a sufficient area so that a view of the integrated circuit 214 beyond the layer 208 is obscured, and preferably blocked. The shield arrangement 230 is typically disposed such that all elements of the integrated circuit 214 beyond the layer 208 are shielded. In accordance with an alternative preferred embodiment of the present invention, only specific features deemed by the designer of the integrated circuit 214 to be vulnerable to attack beyond the layer 208 are preferably shielded for example, but not limited to: a bus operative to carry data which will be encrypted; and/or a signal track of a defense mechanism of the integrated circuit 214.

The shield arrangement 230 is preferably disposed in the layer 208 such that the shield arrangement 230 and one or more of the structures 216 form a region 242. The region 242 preferably includes a plurality of gaps 240. It is important that the gaps 240 are small enough to prevent imaging by the infrared microscope 238 of the integrated circuit 214 beyond the layer 208. Therefore, by way of example, if the IR wavelength used is about 1100 nanometers (band edge of silicon), then the gaps 240 typically need to be less than half the IR wavelength, namely, about 550 nanometers. More accurately, the gaps 240 have a minimum dimension measured parallel to a plane defined by the layer 208, the minimum dimension being less than about 550 nanometers.

The integrated circuit 214 and the shield arrangement 230 are preferably disposed on the silicon substrate 210 in layers using techniques known to those skilled in the art, for example, but not limited to, lithographic fabrication methods.

Figure 17:
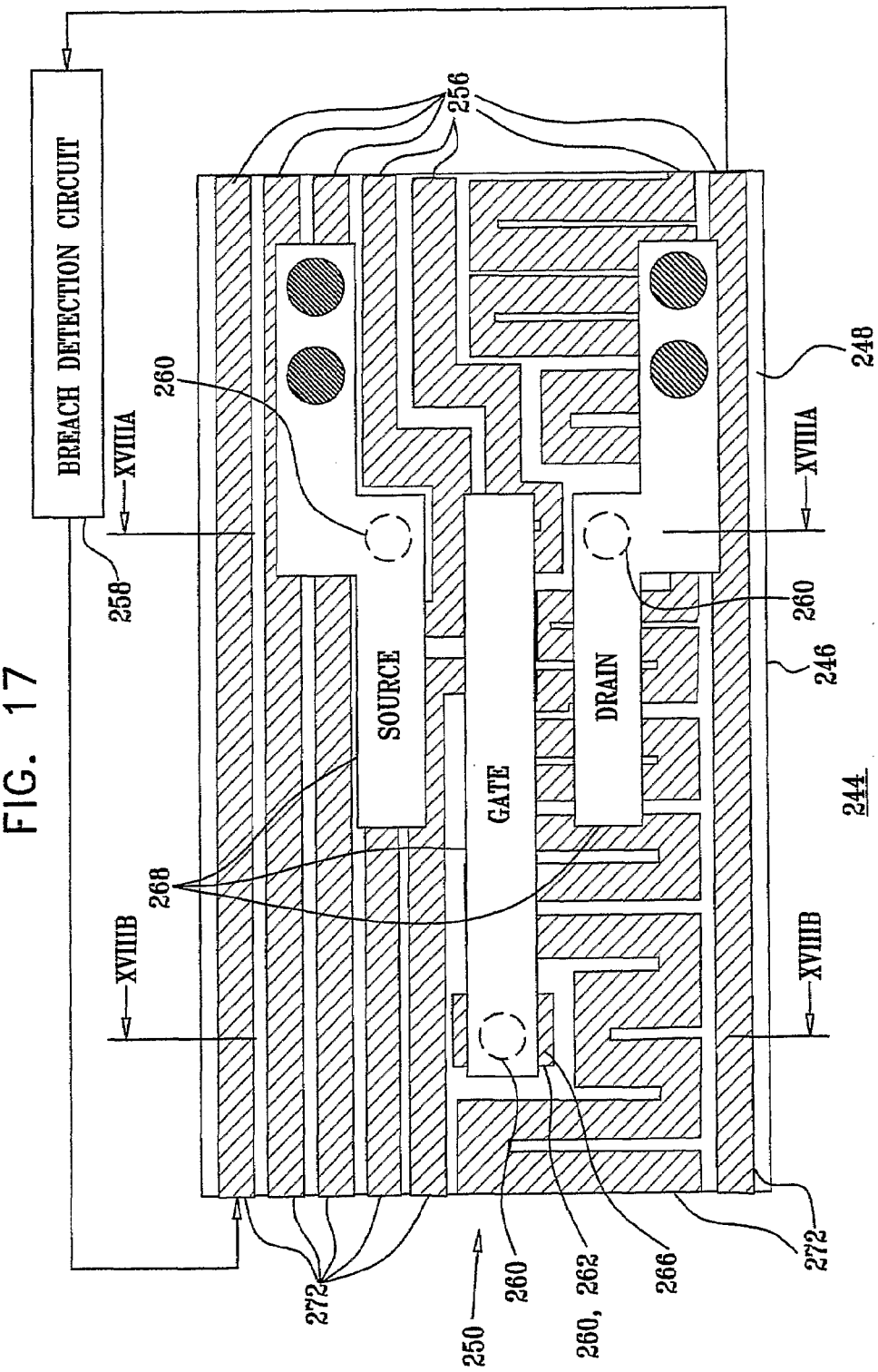
FIG. 17 is a plan view of an integrated circuit protection system constructed and operative in accordance with yet another alternative preferred embodiment of the present invention.

Reference is now made to FIGS. 17, 18a and 18b. FIG. 17 is a plan view of an integrated circuit protection system 244 constructed and operative in accordance with yet another alternative preferred embodiment of the present invention. FIG. 18a is a cross-sectional view through the line XVIIIA of FIG. 17. FIG. 18b is a cross-sectional view through the line XVIIIB of FIG. 17. The system 244 preferably includes: a silicon substrate 246 having a surface 248; and an integrated circuit 250 disposed on the surface 248 of the silicon substrate 246. The integrated circuit 250 preferably includes a layer 252, another layer 254, a shield arrangement 256 and a breach-detection circuit 258.

The layer 252 preferably includes a plurality of structures 260 including one or more bilayer structures 262 (only one shown). Each structure 262 preferably has a polycrystalline silicon sub-layer 264 and a metal silicide sub-layer 266.

The layer 254 preferably includes a plurality of metal elements 268. The layer 252 is closer to the surface 248 than the layer 254.

The shield arrangement 256 preferably includes a polycrystalline silicon sub-layer 270 and a metal silicide sub-layer 272. The shield arrangement 256 is preferably disposed in the layer 252. The metal silicide sub-layer 272 forms a circuit track. The shield arrangement 256 typically follows a winding path over the surface 248 of the silicon substrate 246, not covered by other features in the layer 252.

The metal silicide sub-layer 272 is typically formed from tungsten silicide. It will be appreciated by those ordinarily skilled in the art that other suitable metal silicides may be used, for example, but not limited to tantalum silicide.

The breach-detection circuit 258 is operatively connected to the shield arrangement 256 such that a breach in the shield arrangement 256 is detected by the breach-detection circuit 258. The breach-detection circuit 258 is preferably operative to perform an action on another part of the integrated circuit in response to the detection of the breach, such as chip reset or changing the content of non-volatile memories to affect the functions of the integrated circuit 250 (for example, but not limited to, making the integrated circuit 250 "remember" the event or setting a flag in a register that makes the integrated circuit 250 delete certain information such as cryptographic keys).

Therefore, the shield arrangement 256 preferably provides active protection against attack.

The system 244 is preferably disposed on the silicon substrate 246 in layers using techniques known to those skilled in the art, for example, but not limited to, lithographic fabrication methods.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination. It will also be appreciated by persons skilled in the art that the present invention is not limited by what has been particularly shown and described hereinabove. Rather the scope of the invention is defined only by the claims which follow.

What is claimed is:

1. A chip security system for protecting an integrated circuit (IC) chip from backside attack, the IC chip having a front side and a backside opposite the front side, the front side including an integrated circuit disposed thereon, the system comprising:
   a first antenna disposed on the front side;
   a signal generator disposed on the front side, the signal generator being operationally connected to the first antenna, the signal generator being operative to supply an outbound signal for transmission by the first antenna;
   a backside circuit disposed on the backside of the IC chip, at least part of the backside circuit forming a shielding arrangement, the backside circuit including a second antenna to wirelessly receive the outbound signal transmitted by the first antenna thereby providing power to the backside circuit, the shielding arrangement formed by the at least part of the backside circuit being disposed on the backside to cover enough of the backside in a region facing the integrated circuit such that any gap in the at least part of the backside circuit in the region facing the integrated circuit cannot encompass an area of 50 microns by 50 microns, wherein the backside circuit is operative to transmit a return signal wirelessly from the second antenna to the first antenna, such that a breach in the shielding arrangement results in a change in, or cessation of, the return signal;
   a signal analyzer disposed on the front side, the signal analyzer being operationally connected to the first antenna, the signal analyzer being operative to detect the breach in the shielding arrangement from the change in, or the cessation of, the return signal; and
   a chip controller disposed on the front side, the chip control being operationally connected to the signal analyzer, the chip controller being operative to perform an action on the integrated circuit in response to the detection of the breach by the signal analyzer.

2. The system according to claim 1, wherein the action of the chip controller includes resetting at least part of the integrated circuit.

3. The system according to claim 1, wherein the outbound signal includes a radio-frequency signal.

4. The system according to claim 1, wherein the backside circuit includes active circuit components, the backside circuit including:
   a rectifier to rectify the outbound signal received by the second antenna;
   a checker operationally connected to the rectifier, the checker being operative to check the integrity of the shielding arrangement; and
   a reporter operationally connected to the checker and the second antenna, the reporter being operative to report back using the return signal to the signal analyzer via the second antenna and first antenna on the integrity of the shielding arrangement.

5. The system according to claim 4, wherein the return signal is a pulsed signal.

6. The system according to claim 4, wherein the return signal is a continuous signal.

7. The system according to claim 6, wherein the reporter is operative to form the return signal by amplitude modulating the outbound signal.

8. The system according to claim 1, wherein the backside circuit includes passive circuit components and excludes active circuit components.

9. The system according to claim 1, wherein the backside circuit includes a resonant circuit which has an associated resonant frequency.

10. The system according to claim 9, wherein the return signal has a Q-factor.

11. The system according to claim 10, wherein the signal analyzer is operative to analyze a change in at least one of the resonant frequency and the Q-factor of the return signal in order to detect the breach in the shielding arrangement.

12. The system according to claim 9, wherein the outbound signal includes a swept frequency signal such that the return signal is a maximum when the swept frequency signal is at the resonant frequency.

13. The system according to claim 9, wherein the outbound signal includes a range of frequencies at the same time.

14. The system according to claim 13, wherein the signal generator forms the range of frequencies by generating white noise.

15. The system according to claim 9, wherein the resonant circuit includes an inductor, a capacitor and a resistor, the second antenna being comprised in the inductor.

16. The system according to claim 15, wherein the capacitor is comprised in shielding arrangement.

17. The system according to claim 1, wherein the backside circuit is formed on a film which is mechanically connected to the backside.

18. The system according to claim 17, wherein the film is a plastic film.

19. A chip security system, comprising two integrated circuit (IC) chips including:
   a first IC chip comprising:
      a first surface and a second surface opposite the first surface;
      a first integrated circuit disposed on the first surface;
      a first shield disposed on the first surface; and
      a first shield manager disposed on the first surface, the shield manager being operative to check integrity of the first shield and to perform an action on the first integrated circuit in response to detecting a breach in the first shield;
   a second IC chip comprising:
      a third surface and a fourth surface opposite the third surface;
      a second integrated circuit disposed on the third surface;
      a second shield disposed on the third surface; and
      a second shield manager disposed on the third surface, the shield manager being operative to check integrity of the second shield and to perform an action on the second integrated circuit in response to detecting a breach in the second shield, wherein the first IC chip and the second IC chips are mechanically connected together via the second surface of the first IC chip and the fourth surface of the second IC chip.

20. The system according to claim 19, wherein the chips are mechanically connected together by direct bonding.

21. The system according to claim 20, wherein the chips are bonded together by argon beam surface activation bonding.

* * * * *